United States Patent
Akiyama et al.

(10) Patent No.: US 10,146,502 B2
(45) Date of Patent: Dec. 4, 2018

(54) STREAM-PROCESSING DATA

(71) Applicant: International Business Machines Corporation, Armonk, NY (US)

(72) Inventors: Kazuhito Akiyama, Tokyo (JP); Yasuhisa Gotoh, Yokohama (JP); Hiroya Ogihara, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 217 days.

(21) Appl. No.: 14/799,608

(22) Filed: Jul. 15, 2015

(65) Prior Publication Data
US 2016/0092317 A1    Mar. 31, 2016

(30) Foreign Application Priority Data
Sep. 29, 2014    (JP) ................................ 2014-197939

(51) Int. Cl.
*G06F 7/02* (2006.01)
*G06F 11/07* (2006.01)
*H04L 1/00* (2006.01)
*G06F 11/14* (2006.01)

(52) U.S. Cl.
CPC ............ *G06F 7/02* (2013.01); *G06F 11/0751* (2013.01); *H04L 1/0084* (2013.01); *G06F 11/1443* (2013.01); *G06F 2201/805* (2013.01)

(58) Field of Classification Search
CPC ............... H04L 1/0084; G06F 11/1443; G06F 2201/805; G06F 11/0751; G06F 7/02
USPC ........................ 714/776, 20, 748, 750, 819
See application file for complete search history.

(56) References Cited

U.S. PATENT DOCUMENTS

| | | | |
|---|---|---|---|
| 9,413,542 B2* | 8/2016 | Stanfill | H04L 12/1868 |
| 2003/0016673 A1* | 1/2003 | Pendakur | H04H 60/11 370/394 |
| 2003/0046032 A1* | 3/2003 | Puthiyedath | H04L 29/06027 702/188 |

(Continued)

FOREIGN PATENT DOCUMENTS

| | | |
|---|---|---|
| JP | 11150729 A | 6/1999 |
| JP | 2000040000 A | 2/2000 |

(Continued)

OTHER PUBLICATIONS

"Method and Computer System for Stream-Processing Data and Program for the Same", Japanese Application No. 2014-197939 filed Sep. 29, 2014, 157 pgs.

(Continued)

*Primary Examiner* — Albert Decady
*Assistant Examiner* — Osman M Alshack
(74) *Attorney, Agent, or Firm* — Jay Wahlquist

(57) ABSTRACT

A method for stream-processing data including a missing part in real time and thereafter updating the result of the stream processing. A technique for processing data is included. The technique includes receiving data; detecting a probably missing part in the received data while stream-processing the received data in real time; and comparing master data corresponding to the received data and having no missing part with the probably missing part, and if the received data has the missing part, updating the result of the stream processing using the master data.

18 Claims, 17 Drawing Sheets

(56) References Cited

U.S. PATENT DOCUMENTS

| | | | |
|---|---|---|---|
| 2007/0115832 A1* | 5/2007 | Ramalho | H04L 43/0829 370/241 |
| 2008/0183885 A1* | 7/2008 | Durrey | H04L 1/1887 709/231 |
| 2011/0283156 A1* | 11/2011 | Hiie | H04L 1/0076 714/746 |
| 2012/0254457 A1* | 10/2012 | Condon | H04N 21/23439 709/231 |
| 2012/0300663 A1* | 11/2012 | Lu | H04L 1/1671 370/252 |
| 2013/0166982 A1* | 6/2013 | Zheng | H04L 1/1877 714/748 |
| 2014/0052729 A1* | 2/2014 | Macho | G06F 17/30507 707/738 |
| 2015/0172689 A1* | 6/2015 | Annamraju | H04N 19/44 375/240.25 |

FOREIGN PATENT DOCUMENTS

| | | | |
|---|---|---|---|
| JP | 2003018525 A | 1/2003 | |
| JP | 2003029821 A | 1/2003 | |
| JP | 2004234105 A | 8/2004 | |
| JP | 2005316981 A | 11/2005 | |
| JP | 2006338064 A | 12/2006 | |
| JP | 2008134690 A | 6/2008 | |
| JP | 2008539521 A | 11/2008 | |
| JP | 2009266007 A | 11/2009 | |
| JP | 2010072776 A | 4/2010 | |
| JP | 2011128738 A | 6/2011 | |
| JP | 2013037471 A | 2/2013 | |
| WO | 2013186831 A1 | 12/2013 | |

OTHER PUBLICATIONS

"IBM InfoSphere Streams: Software Platform for the Stream Computing Era," ProVISION No. 65, Spring 2010, pp. 39-44, 6 pgs.

"IBM InfoSphere Streams: IBM Streams Processing Language Specification," Version 2.0, © IBM Corporation, 2009, 2011, 88 pgs.

Unknown, "Storm, distributed and fault-tolerant realtime computation," http://storm.apache.org, 2 pgs. (last accessed May 6, 2015).

Unknown, "Documentation," http://storm.apache.org/documentation/Documentation.html, © 2014 Apache Software Foundation, 2 pgs. (last accessed May 6, 2015).

* cited by examiner

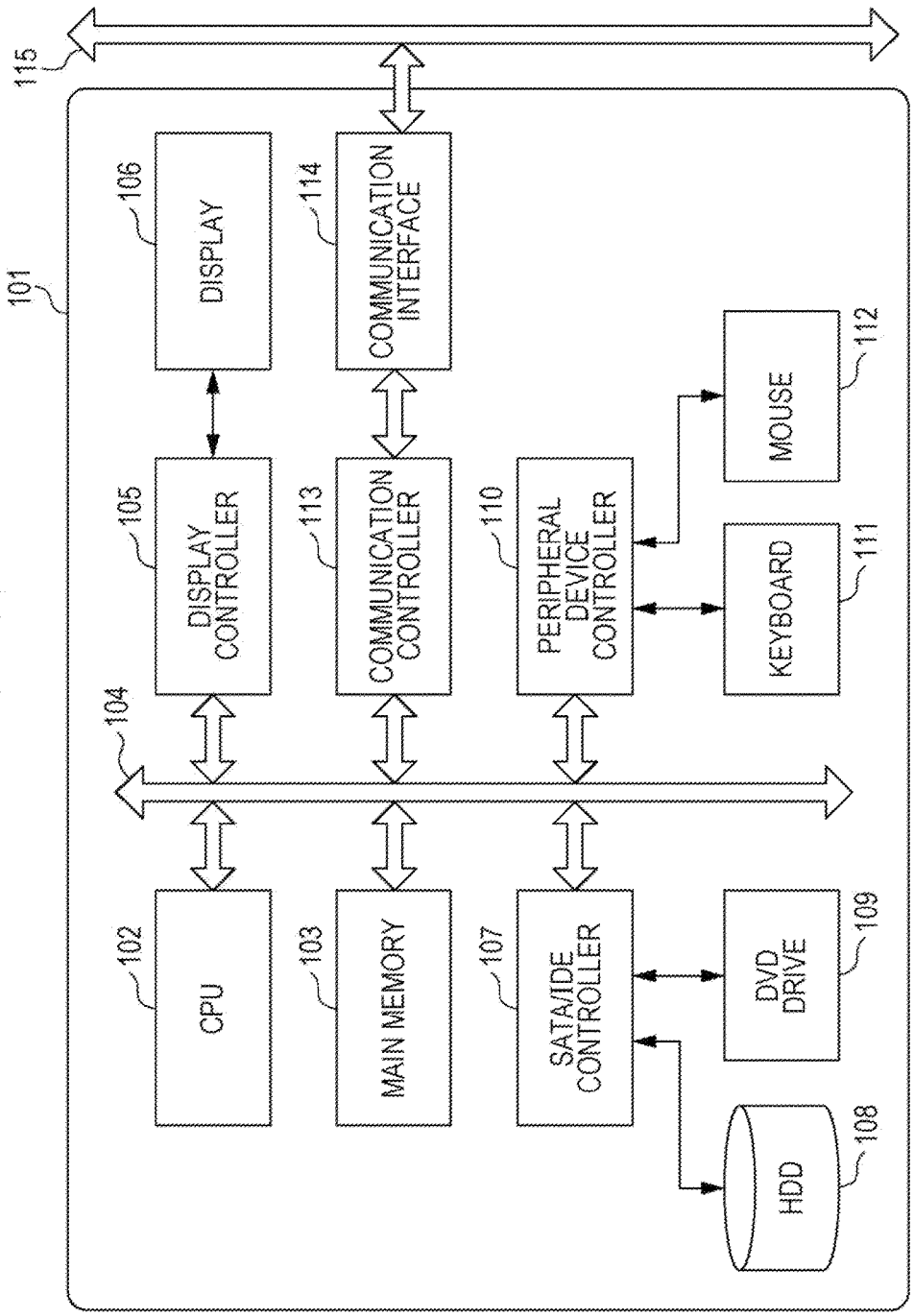

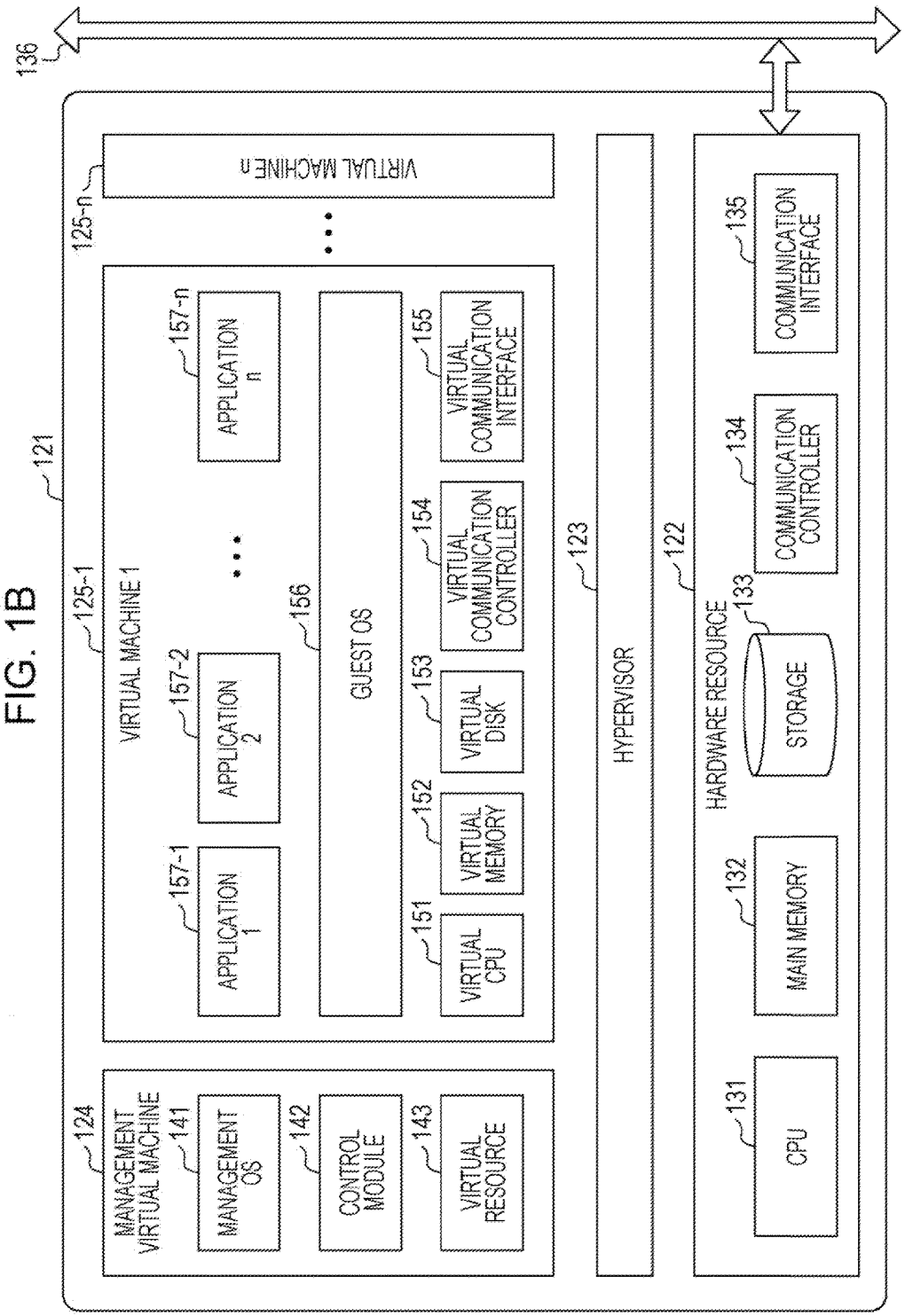

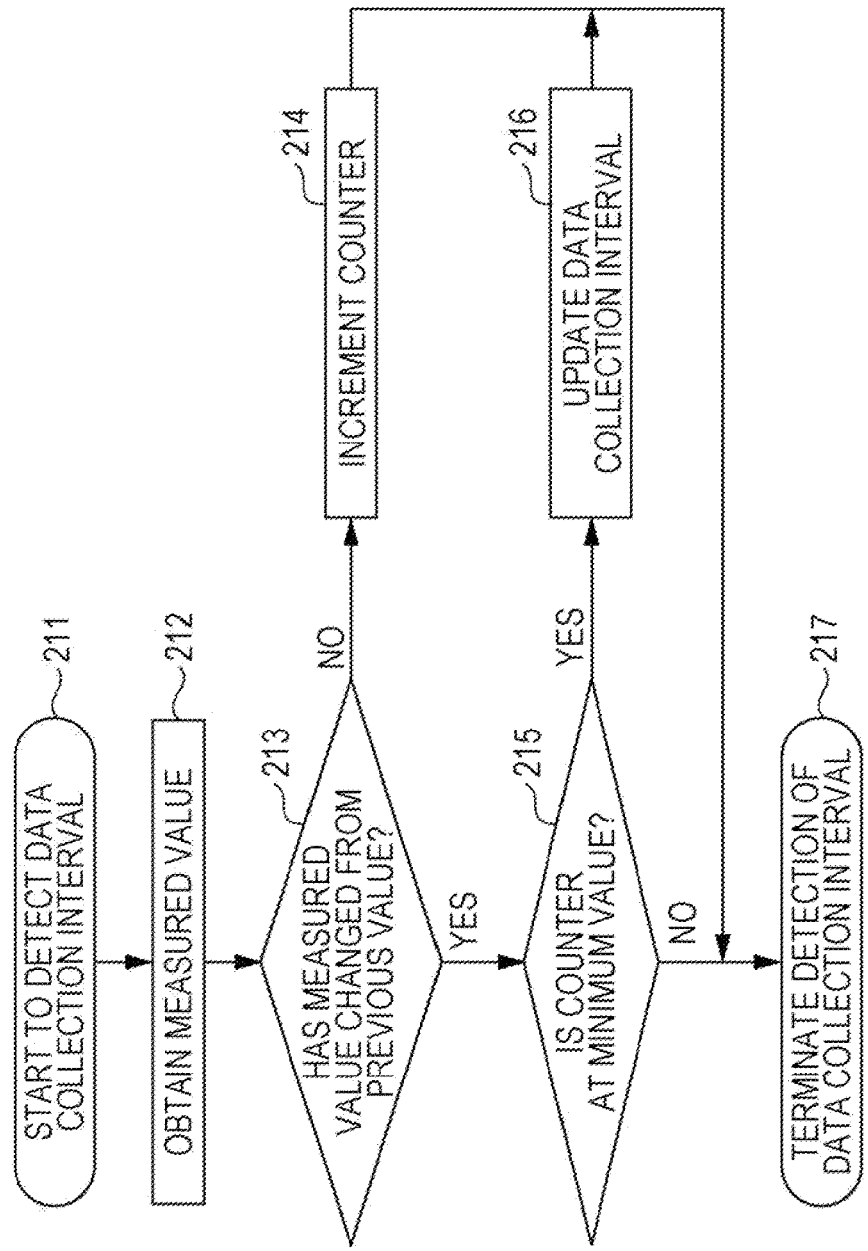

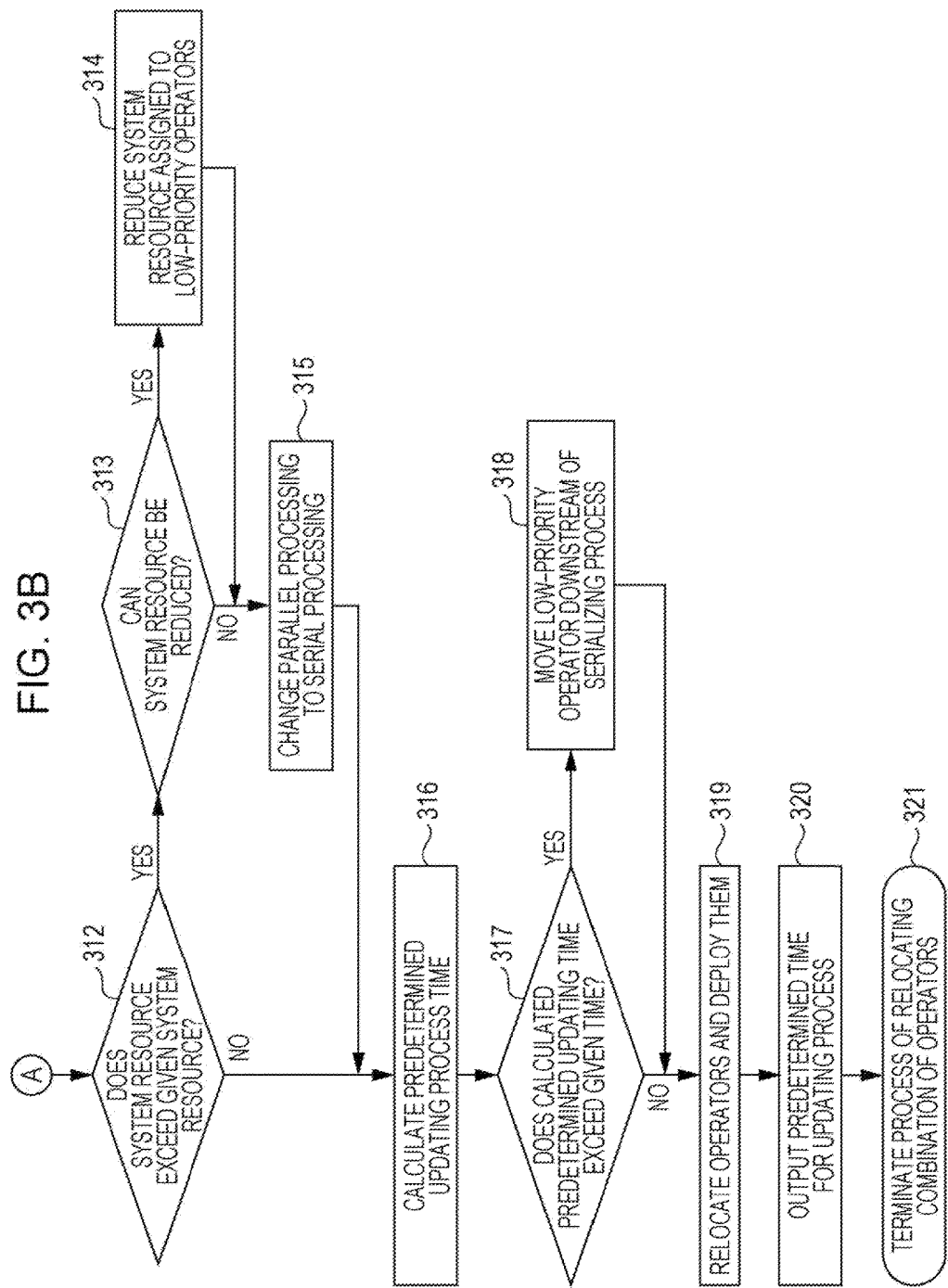

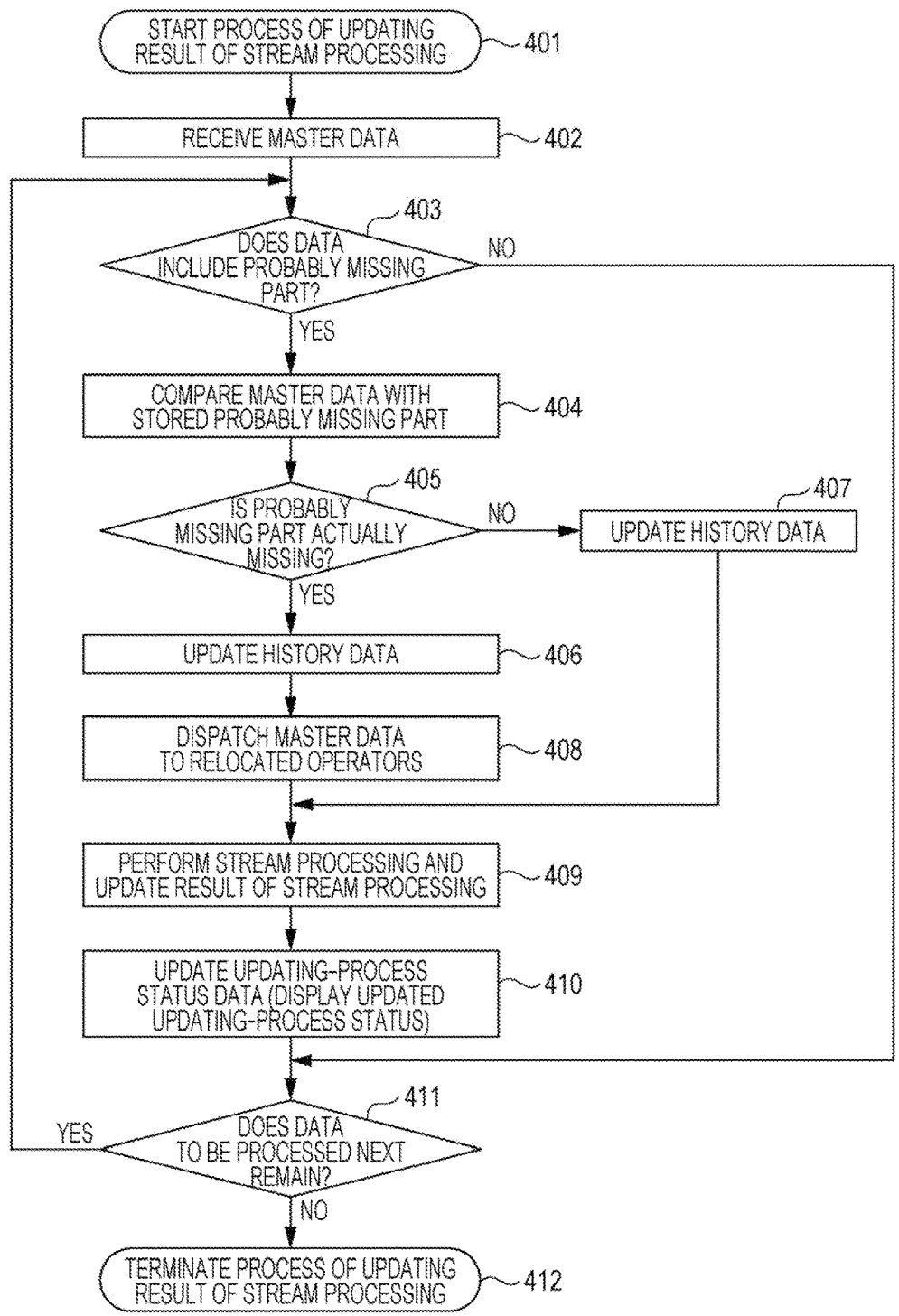

FIG. 5A

DATA COLLECTION INTERVAL — 501

| ID | ATTRIBUTE | INTERVAL |
|---|---|---|
| RACE_2014_01 | ENGINE RPM | 1 ms |
| RACE_2014_01 | OIL PRESSURE | 20 ms |

MISSING HISTORY — 502

| KIND OF PROBABILITY OF MISSING | ATTRIBUTE | RANGE | KIND OF MISSING | CONDITION | PROBABILITY OF MISSING |
|---|---|---|---|---|---|
| CHANGE RATE ABNORMAL | OIL PRESSURE | 15 TO 18 sec. ON THIRD LAP | CORRELATION ABNORMAL (SENSOR INTERVAL) | 400% OR MORE PER 1 ms. | 90% |
| CHANGE RATE ABNORMAL | OIL PRESSURE | 45 TO 47 sec. ON 23RD LAP | CHANGE RATE ABNORMAL | 300% OR MORE AND LESS THAN 400% PER 1 ms. | 70% |
| CORRELATION ABNORMAL | (A) ROTATIONAL SPEED (B) OIL PRESSURE | | | (A)/(B) IS 5.5 OR GREATER MEASUREMENT INTERVAL IS 5 TIMES OR MORE | 80% |
| GAP FROM LAP AVERAGE | MAXIMUM SPEED | 50TH LAP | GAP FROM LAP AVERAGE | 10% OR MORE NORMAL LAP | 50% |

MISSING PROBABILITY — 503

| ATTRIBUTE | KIND OF MISSING | DATA VOLUME | PROBABILITY OF MISSING |
|---|---|---|---|
| OIL PRESSURE | CORRELATION ABNORMAL (SENSOR INTERVAL) | 3,000 | 80% |
| OIL PRESSURE | CHANGE RATE ABNORMAL | 2,000 | 90% |
| SPEED | GAP FROM LAP AVERAGE | 55,000 | 50% |

FIG. 5B

SYSTEM RESOURCE AND PROCESSING TIME 504

| OPERATOR GROUP | NUMBER OF PROCESSED DATA | NUMBER OF PROCESSED ATTRIBUTES | ASSIGNED SYSTEM RESOURCE | PROCESSING TIME |
|---|---|---|---|---|
| AGGREGATION PER 1,000 ms | 7200 | 200 | ONE CORE, 2 GB | 20 min. |
| LAP AGGREGATION | 55 | 200 | ONE CORE, 2 GB | 2 min. |
| 1-ms STORING PROCESS | 7,200,000 | 4,000 | FOUR CORES, 2 GB | 120 min. |
| DETECTION OF OIL SPIKE | 7,200,000 | 2 | ONE CORE, 2 GB | 5 min. |

REPORT STRUCTURE 505

| ATTRIBUTE | TYPE | SAMPLING INTERVAL | ANALYSIS | REPORT |
|---|---|---|---|---|
| ENGINE RPM | AVERAGE, MAXIMUM, MINIMUM, ACCUMULATED | LAP, 1000 ms, 100 ms | ENGINE DURATION, ENGINE WORKING RANGE | MAINTENANCE, DRIVING OPERATION ANALYSIS, ENGINE ANALYSIS |
| OIL PRESSURE | CHANGE RATE, ENGINE RPM CORRELATION | 1 ms, 10 ms | OIL SPIKE, ENGINE ABNORMAL | TROUBLE ANALYSIS |

PROCESS PRIORITY 506

| REPORT | ANALYSIS | ATTRIBUTE | ORDER OF PRIORITY |
|---|---|---|---|
| TROUBLE ANALYSIS | OIL SPIKE | OIL PRESSURE & ENGINE RPM | 1 |
| TROUBLE ANALYSIS | OIL SPIKE | LATERAL ACCELERATION | 2 |
| TROUBLE ANALYSIS | ENGINE ABNORMAL | OIL PRESSURE | 3 |

FIG. 5C

UPDATING PROCESS — 507

| OPERATOR GROUP | OUTPUT ATTRIBUTE | TYPE OF OUTPUT ATTRIBUTE | SAMPLING INTERVAL | DEPENDENT OPERATOR |
|---|---|---|---|---|
| AGGREGATION OF OIL PRESSURE PER 1,000 ms. | OIL PRESSURE | AVERAGE, MAXIMUM, MINIMUM, CHANGE RATE | 1000 ms. | AGGREGATION PER 1,000 ms. |
| AGGREGATION OF LAP SPEED | SPEED | AVERAGE, MAXIMUM, MINIMUM | LAP | LAP AGGREGATION |
| ACCUMULATION OF ENGINE RPM | ENGINE RPM | ACCUMULATION | RACE | LAP AGGREGATION |
| UPDATING PROCESS FOR DETECTING OIL SPIKE | OIL PRESSURE & ENGINE RPM | CORRELATION | 1 ms | DETECTION OF OIL SPIKE |

UPDATING-PROCESS STATUS — 508

| REPORT | ANALYSIS | ATTRIBUTE | UPDATING-PROCESS STATUS | ESTIMATED PROCESSING TIME |
|---|---|---|---|---|
| TROUBLE ANALYSIS | OIL SPIKE | OIL PRESSURE & ENGINE RPM | 100% COMPLETED (UPDATED) | |
| TROUBLE ANALYSIS | OIL SPIKE | LATERAL ACCELERATION | NO MISSING | |
| TROUBLE ANALYSIS | ENGINE ABNORMAL | OIL PRESSURE | 30% | COMPLETED AFTER 15 MINUTES |

STREAM-PROCESSING DATA

CROSS-REFERENCE TO RELATED APPLICATION

This application is related to and claims the benefit of Japan Patent Application No. 2014-197939, filed Sep. 29, 2014, which application is incorporated by reference herein for all purposes.

BACKGROUND

The present disclosure relates to a technique for processing data. In particular, the present disclosure relates to a technique for stream-processing data.

Stream processing (also referred to as stream computing), which is a technique for processing time-series data (also referred to as stream data) that comes one after another, has recently been used. Application of stream processing to high-speed massive-data conversion processing, which has been treated as Extract/Transform/Load (ETL), is expected as well as real-time processing. In this case, a processing speed per core is a particularly important index. Typical applications of stream computing include "an algorithm trade system" for analyzing trading data distributed from a stock market, making a determination, and performing automated trading and "a video surveillance system" for analyzing image data distributed from a surveillance camera, making a determination, and detecting abnormalities.

SUMMARY

According to some embodiments of the present disclosure, aspects of the disclosure may include a method for processing data. The method comprises computer-system implemented steps. As part of the method, data is received. A probably missing part in the received data is detected while stream-processing of the received data in real time. Master data corresponding to the received data and having no missing part is compared with the probably missing part. If the received data has the missing part, a result of the stream processing is updated using the master data.

According to some embodiments of the present disclosure, aspects of the disclosure may further include a computer system for reprocessing data having a missing part. The system comprises at least one computer configured to perform a method. As part of the method, data is received. The received data is stream-processed in real time. A probably missing part is detected in the received data during the stream processing. Whether the received data has a missing part is verified by comparing master data corresponding to the received data and having no missing part with the probably missing part. A result of the stream processing is updated using the master data if the received data has a missing part.

According to some embodiments of the present disclosure, aspects of the disclosure may further include a non-transitory, computer-readable storage medium having program instructions embodied therewith. The program instructions are configured to cause a computer to perform a method. As part of the method, data is received. A result set is obtained by stream processing, in real time, the received data in a first stream processing line. While stream-processing of the received data in real time, it is detected that there is a data part that is probably not included in the received data. In response to the detection, the received data is compared to a data portion of master data. The master data corresponds to the received data and the data portion includes the data part. Based on the comparison, a determination is made that the data part is not included in the received data. A first operator of the first stream processing line that is not associated with the data portion is identified. In response to the determination and based on the identification, a second processing line is defined by deleting the first operator from the first stream processing line. A second result set is obtained by stream processing the data portion of the master data in the second processing line. The first result set is updated using the second result set.

The embodiments described herein are not intended to limit the scope of the present disclosure.

BRIEF DESCRIPTION OF THE DRAWINGS

FIG. 1A is a diagram illustrating an example of a computer system that can be used in an embodiment of the present disclosure or a computer system according to an embodiment of the present disclosure.

FIG. 1B is a diagram illustrating an example of a computer system that can be used in an embodiment of the present disclosure or a computer system according to an embodiment of the present disclosure, in which one or a plurality of virtual machines are operated in the computer system.

FIG. 2B is a flowchart, in the flowchart in FIG. 2A, for the process of detecting the collection interval of the received data.

FIG. 3B is a flowchart for the process of relocating a combination of operators, each of which is one processing unit, according to an embodiment of the present disclosure.

FIG. 4 is a flowchart for the process of updating the result of the stream processing using master data having no missing value corresponding to the received data in accordance with an embodiment of the present disclosure.

FIG. 5A is a diagram showing various data structures that can be used in an embodiment of the present disclosure.

FIG. 5B is a diagram showing various data structures that can be used in an embodiment of the present disclosure.

FIG. 5C is a diagram showing various data structures that can be used in an embodiment of the present disclosure.

DETAILED DESCRIPTION

Figure 2A:
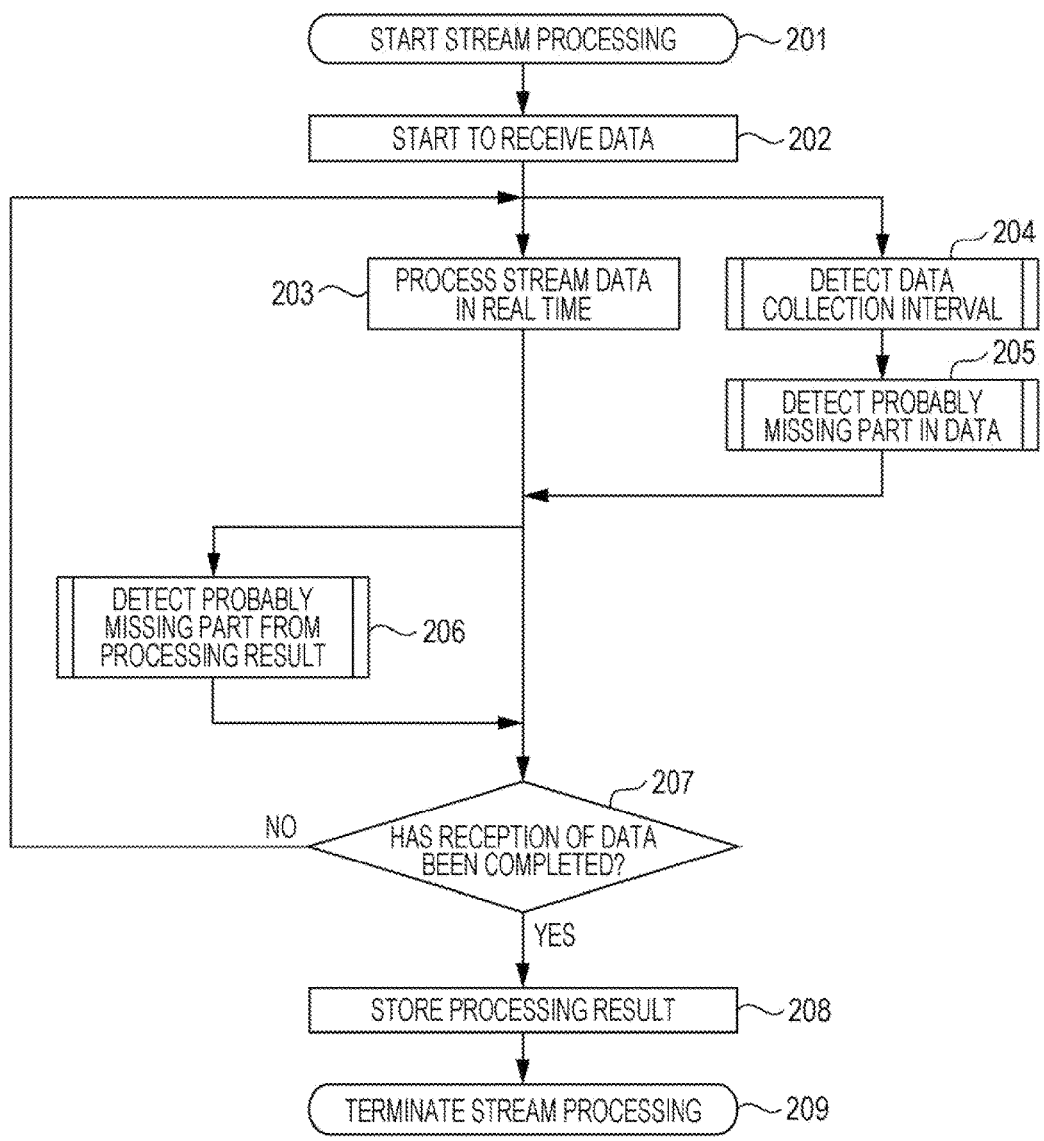
FIG. 2A is a flowchart for the process of detecting a probably missing part in received data while processing stream data in real time in accordance with an embodiment of the present disclosure.

Embodiments of the present disclosure will be described herein with reference to the drawings. The same reference sings denote like parts in the following drawings unless otherwise specified. It is to be understood that the embodiments of the present disclosure are given for mere illustration and are not intended to limit the scope of the present disclosure.

According to a first aspect of some embodiments of the present disclosure, a method for processing data may include the computer-system implemented steps of receiving data and detecting a probably missing part in the received data while stream-processing of the received data in real time; and comparing master data corresponding to the received data and having no missing part with the probably missing part, and if the received data has the missing part, updating a result of the stream processing by using the master data.

In an embodiment of the present disclosure, the stream processing of the received data can be executed in a first stream processing line that is a combination of a plurality of operators, the operators each being one processing unit.

In an embodiment of the present disclosure, the method can further include the computer-system implemented step of relocating the combination of operators for use in updating the result of the stream processing to define a second stream processing line for use in the update.

In an embodiment of the present disclosure, the step of updating the result of the stream processing can include the step of processing the master data in accordance with the second stream processing line to update the result of the stream processing on the basis of a result of the processing.

In an embodiment of the present disclosure, the method can further include the computer-system implemented step of locating the relocated operators on a plurality of processor nodes or a plurality of virtual processor nodes on the computer system.

In an embodiment of the present disclosure, the relocation of the combination of operators can be determined in accordance with a probability of the missing, the type of the missing, a range of influence of the processing result due to the missing, an order of priority of output of the processing result, a dependency relationship among the operators, a processing time allowable for the update, a system resource available for the update, or a combination thereof.

In an embodiment of the present disclosure, if a processing time allowable for the update, a system resource available for the update, or a combination thereof is limited, the relocation of the combination of operators can be determined in accordance with an order of priority of output of the processing result.

In an embodiment of the present disclosure, the step of detecting a probably missing part in the received data can further include the step of outputting a range of data that may have a missing part, a probability of the missing, a type of the missing, a range of influence of the processing result due to the missing, an order of priority of output of the processing result, a dependency relationship among the operators when the stream processing is executed in a stream processing line that is a combination of operators, each of the operators being one processing unit, a processing time required for the operators to perform the stream processing, a system resource required for the operators to perform the stream processing, or a combination thereof.

In an embodiment of the present disclosure, the data may be measured values from at least one sensor; and the step of detecting a probably missing part in the received data can include the step of detecting the probably missing part using the measured values or using values calculated in real time by the stream processing.

In an embodiment of the present disclosure, the data may be measured values from at least one sensor; and the step of detecting a probably missing part in the received data can further include the step of detecting a collection interval of the measured values.

In an embodiment of the present disclosure, the step of detecting a probably missing part in the received data can include the step of, if a difference in the collection interval is detected, detecting data of a part in which the difference is detected as a probably missing part.

In an embodiment of the present disclosure, the step of updating the result of the stream processing can include the step of updating, of results of the stream processing, a result caused by the missing due to the difference in the collection interval, using a result obtained by processing the master data.

In an embodiment of the present disclosure, the step of detecting a probably missing part in the received data can include the step of detecting the probably missing part, if the received data has a missing value in a time series; if the received data has an abnormal value; if the received data has a value that does not change for a fixed period; if the received data has a value whose change rate is abnormal; if a data collection interval changes; if a correlation among a plurality of related attributes is abnormal; or if a value obtained by comparing differences among values obtained from repeated actions is abnormal; or with reference to missing history data in which a missing history is stored.

In an embodiment of the present disclosure, the step of updating a result of the stream processing can further include the step of, if the received data has the missing part, processing the master data so as to update a result caused from the missing part.

In an embodiment of the present disclosure, the step of updating a result of the stream processing can include the step of updating a report on an update status in real time.

In an embodiment of the present disclosure, the report indicating the update status can include a report indicating that the update is completed; a report indicating that the data has no missing part; or a report indicating a predetermined update completion time or a progress of the update.

In an embodiment of the present disclosure, the step of updating a result of the stream processing can further include the steps of, if the update cannot be completed within a processing time allowable for the update, stopping the updating process; and marking an unupdated result in response to stopping the updating process.

In an embodiment of the present disclosure, the step of updating a result of the stream processing can include the step of calculating a difference between the result of the stream processing and a result of processing the data having no missing part and correcting the result of the stream processing using the calculated difference.

In another aspect of some embodiments of the present disclosure, a computer system for reprocessing data having a missing part may include data receiving means for receiving data; stream processing means for stream-processing the received data in real time; probability-of-missing detecting means for detecting a probably missing part in the received data during the stream processing; missing verifying means for verifying whether the received data has a missing part by comparing master data corresponding to the received data and having no missing part with the probably missing part; and stream-processing-result updating means for updating a result of the stream processing using the master data if the received data has a missing part.

In an embodiment of the present disclosure, the stream processing means can execute the stream processing on the received data in a first stream processing line that is a combination of a plurality of operators, each of the operators being one processing unit.

In an embodiment of the present disclosure, the computer system can further include operator relocating means for relocating the combination of operators for use in updating a result of the stream processing to define a second stream processing line for use in the update.

In an embodiment of the present disclosure, the stream-processing-result updating means can process the master data in accordance with the second stream processing line to update the result of the stream processing on the basis of a result of the processing.

In an embodiment of the present disclosure, the computer system can further include locating means for locating the relocated operators on a plurality of processor nodes or a plurality of virtual processor nodes on the computer system.

In an embodiment of the present disclosure, the operator relocating means can determine the relocation of the combination of operators in accordance with a probability of the missing, a type of the missing, a range of influence of the processing result due to the missing, an order of priority of output of the processing result, a dependency relationship among the operators, a processing time allowable for the update, a system resource available for the update, or a combination thereof.

In an embodiment of the present disclosure, the operator relocating means can determine the relocation of the combination of operators in accordance with an order of priority of output of the processing result if a processing time allowable for the update, if a system resource available for the update, or if a combination thereof is limited.

In an embodiment of the present disclosure, the probability-of-missing detecting means can further output a range of data that may have a missing part, a probability of the missing, a type of the missing, a range of influence of the processing result due to the missing, an order of priority of output of the processing result, a dependency relationship among the operators when the stream processing is executed in a stream processing line that is a combination of operators, each of the operators being one processing unit, or a combination thereof.

In an embodiment of the present disclosure, the computer system can further include a stream-processing-time calculating unit that further outputs a processing time required for the operators to perform the stream processing, a system resource required for the operators to perform the stream processing, or a combination thereof.

In an embodiment of the present disclosure, the data may be measured values from at least one sensor, and the probability-of-missing detecting means can detect the probably missing part using the measured values or using values calculated by the stream processing in real time.

In an embodiment of the present disclosure, the data may be measured values from at least one sensor; and the computer system can further include data-collection-interval detecting means for detecting a collection interval of the measured values.

In an embodiment of the present disclosure, if a difference in the measured-value collection interval is detected, the probability-of-missing detecting means can detect data of a part in which the difference is detected as a probably missing part.

In an embodiment of the present disclosure, the stream-processing-result updating means can update, of results of the stream processing, a result caused by the missing due to the difference in the collection interval, using a result obtained by processing the master data.

In an embodiment of the present disclosure, the probability-of-missing detecting means can detect the probably missing part if the received data has a missing value in a time series; if the received data has an abnormal value; if the received data has a value that does not change for a fixed period; if the received data has a value whose change rate is abnormal; if a data collection interval changes; if a correlation among a plurality of related attributes is abnormal; or if a value obtained by comparing differences among values obtained from repeated actions is abnormal; or with reference to missing history data in which a missing history is stored.

In an embodiment of the present disclosure, if the received data has the missing part, the stream-processing-result updating means can process the master data so as to update a result caused from the missing part.

In an embodiment of the present disclosure, the stream-processing-result updating means can further update a report indicating an update status in real time.

In an embodiment of the present disclosure, the report indicating the update status can include a report indicating that the update is completed; a report indicating that the data has no missing part; or a report indicating a predetermined update completion time or a progress of the update.

In an embodiment of the present disclosure, if the update cannot be completed within a processing time allowable for the update, the stream-processing-result updating means can further stop the updating process and can mark an unupdated result when the updating process is stopped.

In an embodiment of the present disclosure, the stream-processing-result updating means can calculate a difference between the result of the stream processing and a result of processing the data having no missing part and can correct the result of the stream processing using the calculated difference.

In yet another aspect of some embodiments of the present disclosure, a computer system program or a computer system program product for processing data may cause a computer system to execute the steps of one or more methods of the present disclosure.

An computer system program according to an embodiment of the present disclosure can be stored in one or a plurality of flexible disks, MOs, CD-ROMs, DVDs, BDs, hard disks, memory media connectable to a USB, and any computer-readable recording medium, such as a ROM, an MRAM, or a RAM. The computer system program can be loaded into a recording medium from another computer, such as a server computer, connected via a communication line or can be copied from another recording medium. The computer system program according to an embodiment of the present disclosure can also be compressed or divided into a plurality of pieces and can be stored in one or a plurality of recording media. Note that it is of course possible to provide computer system program products according to an embodiment of the present disclosure in various forms. Examples of the computer system program products according to the embodiment of the present disclosure can include a storage medium in which the computer system program is recorded and a transmission medium that transmits the computer system program.

Note that the outline of the present disclosure described above does not include all necessary features of the present disclosure and a combination or sub-combination of these components can also be the present disclosure.

It will also be obvious to those skilled in the art that various changes can be made in the hardware components of the computer used in an embodiment of the present disclosure, such as combining them with a plurality of machines and distributing the functions thereto. These changes are of course included in the spirit of the present disclosure. These components are merely examples, and not all the components are absolutely necessary for the present disclosure.

The present disclosure can be achieved as hardware, software, or, a combination of hardware and software. A typical example of implementation using a combination of hardware and software is implementation in a computer system in which the computer system program is installed. In such a case, by loading the computer system program into the memory of the computer system and implementing it, the computer system program controls the computer system and causes the computer system to implement processes according to the present disclosure. The computer system program can include sets of instructions that can be expressed by any languages, codes, or notations. Such instructions allow the computer system to implement a specific function directly or after one or both of 1. converting it to another language, code, or notation and 2. copying it to another medium.

With a technique for processing data according to an embodiment of the present disclosure, a probably missing part in data having a missing part is detected while the data is stream-processed in real time. This allows a result of stream processing after the stream processing to be updated (corrected) in a limited time and with a limited system resource.

Furthermore, with a technique for processing data according to an embodiment of the present disclosure, a stream processing line used in real-time stream processing is relocated so as to be suitable for the update. This allows a result of stream processing after the stream processing to be updated (corrected) in a limited time and with a limited system resource. Since the relocation is executed automatically, there is no need for a computer programmer to rewrite code.

Furthermore, with a technique for processing data according to an embodiment of the present disclosure, the processing result can be updated in a limited time and with a limited system resource. This may allow client' needs for short-time processing and a low-cost final processing result to be satisfied.

A method for processing massive data is to temporarily store massive data in a computer and then analyze it. This processing method is a stock-type data technique using a database.

Stream computing for processing, and not storing (in some situations), a large volume and a variety of data coming from moment to moment (also referred to as stream data or events) in real time with a server, has recently attracted attention. The stream computing may allow tens of thousands to millions or more data items to be processed. The stream computing may be a programming method for parallel processing. The use of stream processing may allow computer programmers to benefit from no needing to manage a large number of cores (or units of operation) on a chip, buses, memories, and I/Os connected thereto, separately.

Many sensors and devices have recently been used around the world. For example, various sensors are installed in vehicles, roads, and factories. By collecting various items of data (for example, control information, positional information, conditions of travelling, and temperatures) transmitted from the sensors and devices one by one and analyzing them in real time for an application (that is, stream processing), various immediate services useful for companies or individuals can be achieved.

The implementation of stream computing may allow various changes in events and situations in the real world to be recognized in real time, thus allowing rapid actions to be taken and suitable services to be provided.

However, part of data received in real time can sometimes be lost in a transfer path. In such a case there may sometimes be a need to analyze the data in real time and reevaluate the data using data without a missing part. Furthermore, such reevaluation may sometimes be performed in a short time using a limited system resource.

For example, suppose test driving is performed in vehicle development.

In this scenario, vehicles are equipped with a large number of electronic control units (ECUs) and collect various items of data (big data or measurement values) from a large number of sensors. In test driving, various items of data are collected from the ECUs and are analyzed for application.

However, when a server computer receives various items of data from a remote system of a vehicle during test driving for performing stream processing, part of the data may sometimes be lost in a data transfer path. Even if part of the data is missing, the server computer may continue stream processing on the data to analyze the data in real time and may feed the results back to the test driving site.

Continuing the scenario, vehicles may have recording mediums in which the various items of data are stored. Thus, by taking out the recording medium after completion of the test driving or by copying the various items of data from the recording medium to another recording medium, data having no missing part can be obtained.

Analyzing the various items of data in real time during test driving and monitoring the analysis (e.g., looking for a false result based on a missing data part) are important may be important for obtaining driving characteristics depending on an actual road condition and further may be important for giving real-time instructions about control of the vehicle (for example, engine speed or gear setting) and various driving operations, such as handling, in test driving. Thus, starting the various data processing operations after data items having no missing parts are collected (that is, after completion of the test driving) may prevent effective data acquisition during driving, resulting in insufficient evaluation of test driving.

Continuing the scenario further, several days or weeks may be spent to analyze data having no missing parts. However, in general, the process of performing several hours of test driving to evaluate the performance, and performing adjustment of the vehicle, setting changes, refueling, and other works on the basis of the result, and then performing test driving again is repeated several times. For example, it is assumed that the first test driving is performed, and immediately after completion thereof, a vehicle adjusting work is performed, and then a second test driving is performed. To effectively evaluate the result of the first test driving in a limited time and to use the result effectively in the next driving, data having no missing part needs to be analyzed as a result of the first test driving within a limited time after completion of the first test driving (for example, about 10 to 30 minutes).

Accordingly, some embodiments of the present disclosure may provide a technique for processing stream data including a missing part in real time (for example, computing) and updating the result of the stream processing.

Further, some embodiments of the present disclosure may provide a method for allowing, when the data including no missing part is received, updating the result obtained in real time in just a short time afterward with a limited system resource.

Further, some embodiments of the present disclosure may provide a technique for processing data. The technique can include a method and a computer system for processing data, and a program and a program product for the computer system.

Current diversification of information resources has led to a steady increase in the volume of stream data. Furthermore, modern vehicles may be equipped with a large number of vehicle control computers called electronic control units (ECUs). The ECUs collect data from many sensors from moment to moment.

An example of an applicable software platform for stream processing is IBM® InfoSphere® Streams (IBM and InfoSphere are registered trademarks of International Business Machines Corporation of Armonk, N.Y). Under a development environment using the IBM® InfoSphere® Streams, programs are developed using a programming language for stream computing. One such programming language is called a stream processing language (SPL), which is used to describe a program with a combination of operators. In some situations, one operator may correspond to one processing unit, and a program may be configured in accordance with its processing flow. To this end, the programming language SPL may be intuitive, easy to understand, and simple.

In situations, methods may be used for forming a high-precision probability model of measurement information having three or more dimensions and for updating the probability model in sequence by stream processing. Furthermore, in some situations, a telemeter may be used. The telemeter may record, during a communication error, data values obtained immediately before the communication error, may obtain the data recorded in a monitoring terminal after recovering from the communication error, and may correct data in a monitoring device.

Furthermore, in some situations, there may be ways to remove defective data, such as social networking service (SNS) sample data having missing attribute values, and then register temporary analysis set data, in which the defective data is removed, as analysis set data.

Furthermore, in some situations, a method may be used for analyzing data, characterized in that, if the values of one data item present in a record to be analyzed contains a missing value, a symbol value indicating the missing value is added as the symbol value of the data item, an instruction of whether to use the symbol value indicating the missing value in the rule to be created is given to the individual data items, and the data stored in a database is analyzed so that a plurality of candidate rules indicating the correlation among a plurality of selected data items are created.

Furthermore, in some situations, a data management system may issue a command for a terminal to resend defective sensing data to the terminal. Furthermore, in some situations, a method may be used for restoring one or more blocks of data on demand.

Furthermore, in some situations, a disaster recovery method may be used. The method may be characterized in that it is determined in the event of a disaster whether data that is backed up to a subsystem is missed from the information of a copy function of a storage stored in a transfer-information acquisition unit. Furthermore, in some situations, a method may be used for detecting data corruption on a storage volume related to a file system request and recovering the data in real time, with the storage volume kept active on-line.

Furthermore, in some situations, a monitoring control system may be used to help ensure arrival reliability and high-speed transmission of plant data of the entire system if a controller has a time guarantee mechanism to allow efficient use of a transmission band.

Furthermore, in some situations, a network-storage video camera system may be used for allowing missing data after recording to be recovered when storing video data acquired by a camera. Furthermore, in some situations, a data processing unit may be configured such that even if an error occurs during transmission of image data, missing of images is dispersed, without continuous missing of a great number of images, thus facilitating grasping an entire image.

FIG. 1A is a diagram illustrating an example of a computer system that can be used in an embodiment of the present disclosure or a computer system according to an embodiment of the present disclosure. The computer system may include, for example, one or a plurality of computers, such as a server computer (for example, a computer having a server function), but is not limited thereto.

A computer system 101 includes one or a plurality of CPUs 102 and a main memory 103, which are connected to a bus 104. The CPU 102 is based on, for example, a 32-bit or 64-bit architecture. Examples of the CPU 102 include, Power™ series of International Business Machines Corporation, Xeon® series, Core™ i series, Core™ 2 series, Pentium® series, and Celeron® series, and Atom™ series of Intel Corporation, and Opteron™ series, A series, Phenom™ series, Athlon™ series, Turion® series, and Sempron™ of Advanced Micro Devices (AMD).

A display 106, such as a liquid crystal display (LCD), can be connected to the bus 104 via a display controller 105. Examples of the liquid crystal display (LCD) may include a touch panel display and a floating touch display. The display 106 can be used to display an object with an appropriate graphic interface, the object being displayed when any computer system program running on software running on the computer system 101 (for example, a computer system program according to an embodiment of the present disclosure or any computer system program running on the computer system 101) operates. The display 106 can output the screen of a web browser application, for example.

A disk 108, such as a hard disk or a solid state drive (SSD), can be optionally connected to the bus 104 via a SATA/IDE controller 107, for example.

A disk drive 109, such as a CD, DVD, or BD drive, can be optionally connected to the bus 104 via the SATA/IDE controller 107, for example.

A keyboard 111 and a mouse 112 can be optionally connected to the bus 104 via a peripheral device controller 110, such as a keyboard/mouse controller or a USB bus.

The disk 108 can store an operating system, for example, an operating system developed for a main frame (for example, z/OS, z/VM, or z/VSE), Windows®, UNIX®, Linux®, Mac® OS, Android®, and programs that provide Java® processing environment, Java® applications, Java® virtual machines (VMs), Java® Just-In-Time (JIT) compilers, a computer system program according to an embodiment of the present disclosure, any other computer system programs, and data so as to load them in the main memory 103.

The disk 108 can store software that allows stream processing so as to load it in the main memory 103.

The disk 108 may be installed in the computer system 101, may be connected to the computer system 101 through a cable or over a wired or wireless network so that the computer system 101 can access it.

The drive 109 can be used to install a program for example, an operating system, an application program, or a computer system program according to an embodiment of the present disclosure, into the disk 108 from a CD-ROM, a DVD-ROM, or a BD as needed.

A communication interface 114 conforms to, for example, an Ethernet® protocol. The communication interface 114 is connected to the bus 104 via a communication controller 113 and plays the role of connecting the computer system 101 to a communication line 115 by wire or wirelessly and provides a network interface layer to a TCP/IP communication protocol, which is the communication function of the operating system of the computer system 101. The communication line 115 can be a wireless LAN environment based on a wireless LAN connection standard, a WiFi wireless LAN environment, such as IEEE802.11a/b/g/n, or a mobile phone network environment (for example, a 3G LTE, or 4G environment).

FIG. 1B is a diagram illustrating an example of a computer system that can be used in an embodiment of the present disclosure or a computer system according to an embodiment of the present disclosure, in which one or a plurality of virtual machines are operated in the computer system. Examples of the computer system may include a workstation, a rack mount server, a blade server, a midrange computer, and a mainframe computer.

A computer system 121 shown in FIG. 1B may include, as hardware resources 122, one or a plurality of CPUs 131, a main memory 132, a storage 133, a communication controller 134, and a communication interface 135. The one or plurality of CPUs 131, the main memory 132, the storage 133, the communication controller 134, the communication interface 135, and the communication line 136 correspond to the one or plurality of CPUs 102, the main memory 103, the disk 108, the communication controller 113, the communication interface 114, and the communication line 115 of the computer system 101 shown in FIG. 1A, respectively.

The computer system 121 operates as a physical host machine and can operate one or plurality of virtual machines 1 to n (125-1 to 125-*n*) (also referred to as domain-U or a child partition) on a hypervisor (also referred to as a virtual machine monitor or a virtual OS) of virtualization software (for example, VMWare®, Hyper-V®, or Xen®) using the same or different OSs (for example, Windows®, UNIX®, or Linux®) as a guest OS 156.

The computer system 121 can also operate a management virtual machine 124 (also referred to as domain-0 or a parent partition) on the hypervisor 123. The management virtual machine 124 includes a management OS 141, a control module 142 operating on the management OS 141, and a virtual resource 143. The control module 142 is a module for issuing a command to the hypervisor 123. The control module 142 also issues a command to create the virtual machines 1 to n (125-1 to 125-*n*) of user domain and a command to start the guest OS 156 to the hypervisor 123 to control the operations of the virtual machine 1 to n (125-1 to 125-*n*). The virtual resource 143 is a hardware resource 122 assigned for the management virtual machine 124.

The virtual machines 1 to n (125-1 to 125-*n*) include a virtual resource, the guest OS 156, and various applications 1 to n (157-1 to 157-*n*) operating on the guest OS 156. Examples of the virtual resource include a virtual CPU 151, a virtual memory 152, a virtual disk 153, a virtual communication controller 154, and a virtual communication interface 155.

FIGS. 2A to 2D are flowcharts for processing data in accordance with an embodiment of the present disclosure.

Note that the computer system described herein as computer system 121 may be the computer system 101 shown in FIG. 1A instead of the computer system 121 shown in FIG. 1B.

FIG. 2A is a flowchart for the process of detecting a probably missing part in received data while processing stream data in real time in accordance with an embodiment of the present disclosure.

At step 201, the computer system 121 starts to process stream data in real time.

At step 202, the computer system 121 starts to receive data from another system (for example, a remote system) over a wired or wireless network.

The received data can be stream data. The stream data is time-series data coming one after another, which is also referred to as an event. The stream data can be live data from a sensor. The stream data can be big data. The stream data can be, for example, data sent from various sensors or data generated from one moment to another moment. The stream data can be data sent from computers (for example, ECUs) provided in transportation, such as a vehicle, an airplane, or a train, data from a space station in space, radio-wave information sent from space, data from measuring devices, such as a sensor and an antenna, data from a smart meter, data from Internet of Things (IoT), traffic information data, trading data in a securities industry, or a call detail record (CDR), but is not limited to such specific examples.

The data, when received by the computer system 121, has a missing part for some reason (for example, its transfer path).

At step 203, the computer system 121 processes the received data stream in real time.

The process may be a calculation process or a process including a calculation process. The stream processing is executed in, for example, a stream processing line (hereinafter referred to as a first stream processing line) that is a combination of a plurality of operators, each of which is one processing unit. The first stream processing line may be a combination of operators combined in accordance with a combination defined by a user in advance or by software that automatically constructs a stream processing line. The operators may be distributed onto a plurality of processor nodes or virtual machines for deployment in accordance with an assigned time or system resource. The deployment may enable the distributed combination of operators to be executed (for comparison it may be helpful to imagine compilation with a compiler).

An example of a software platform for stream processing is IBM® InfoSphere® Streams. The IBM® InfoSphere® Streams is a comprehensive platform for processing a massive stream of data. The IBM® InfoSphere® Streams deploys a plurality of operators disposed on any number (e.g., thousands) of processor nodes to provide a scalable execution environment that may allow a nearly infinite capacity and a short (e.g., millisecond) response time. The IBM® InfoSphere® Streams may describe individual processes in a defined language (SPL) to allow them to be reused as operators. The IBM® InfoSphere® Streams may group operators to facilitate assigning the processing order and resources, thus allowing development of applications and improvement in debugging.

In addition to the IBM® InfoSphere® Streams, other available software platforms for stream processing include products for stream processing sent to the market from Amazon Inc. and Hitachi, Ltd. and systems for stream processing held by Stanford University, Berkley, MIT, and A&T.

At step 203, the computer system 121 can obtain or calculate a processing time required to process the stream data in real time for each operator. The computer system 121 can store the obtained or calculated processing time in a recording medium for storing the processing time.

At step 203, the computer system 121 can obtain or calculate a system resource required to process the received stream data in real time for each operator. The computer system 121 can store the obtained or calculated system resource in a recording medium for storing the system resource.

At step 204, the computer system 121 can optionally detect the collection interval of the data received at step 202 to detect a probably missing part of the data. The details of the process of detecting the data collection intervals will be described separately with reference to the flowchart shown in FIG. 2B.

At step 205, the computer system 121 detects a probably missing part of the data received at step 202 while processing the stream data in real time, as shown at step 203. The computer system 121 can detect a probably missing part of the received data on the basis the data collection interval detected at step 204. The computer system 121 can detect a probably missing part of the received data and obtain or calculate the probability of missing (for example, percentage) with reference to missing history data accumulated in the past. The details of the process of detecting a probably missing part in the received data will be described separately with reference to the flowchart in FIG. 2C.

At step 206, the computer system 121 detects a probably missing part in the result of the stream processing performed at step 203 (for example, a calculation result) while processing the stream data received at step 202 in real time, as shown in step 203. The computer system 121 can detect an anomaly of the change rate shown in FIG. 2D (step 243), an anomaly of correlation (step 245), and a difference from the calculated values (step 247) while referencing whether the probably missing part detected at step 205 is used in the processing result. The details of the process for detecting a probably missing part in the result of the stream processing will be described separately with reference to the flowchart shown in FIG. 2D.

The computer system 121 can perform the real-time stream processing at step 203, the process of detecting a data collection interval at step 204, the process of detecting a probably missing part at step 205, and the process of detecting a probably missing part in the result of the stream processing at step 206 in parallel.

At step 207, the computer system 121 determines whether the reception of data started at step 202 has been completed. The determination can be made when a measurement termination signal is sent from another system (for example, the remote system) or when data is not transmitted for a predetermined period. If the reception of data is completed, the computer system 121 goes to step 208. In contrast, if the reception of data has not been completed, the computer system 121 returns to step 203 and repeats steps 203 to 207 until the data reception is completed.

At step 208, the computer system 121 can output the result of the real-time stream processing at step 203 (hereinafter, also referred to as a stream processing result) onto the screen of the display 106 or in the form of a print or a file. The computer system 121 can also store the stream processing result in a recording medium for storing a stream processing result.

At step 209, the computer system 121 terminates the real-time data stream processing.

Subsequently, the computer system 121 may start a process shown in FIG. 3A to FIG. 3B for a process of relocating the combination of operators, each of which is one processing unit.

FIG. 2B is a flowchart, of the flowchart in FIG. 2A, for the process of detecting the collection interval of the data (step 204) received at step 202.

At step 211, the computer system 121 starts the process of detecting the collection interval of the data received at step 202.

At step 212, the computer system 121 obtains data or a measured value. The measured value may be a measured value sent from a sensor.

At step 213, the computer system 121 determines whether the obtained measured value has changed from the previous measured value. If the obtained measured value has not changed from the previous measured value, the computer system 121 goes to step 214. In contrast, if the obtained measured value has changed from the previous measured value, the computer system 121 goes to step 215.

At step 215, the computer system 121 determines whether the counter is at the minimum value. If the counter is at the minimum value, the computer system 121 goes to step 216. In contrast, if the counter is not at the minimum value, the computer system 121 goes to step 217.

If at step 213 the obtained measured value has not changed from the previous measured value, the computer system 121 increments the counter at step 214. Then, the computer system 121 goes to end step 217.

If at step 215 the counter is at the minimum value, then, at step 216, the computer system 121 updates the data collection interval. The computer system 121 then goes to end step 217.

At step 216, the computer system 121 can store the updated data collection interval in, for example, a recording medium for recording data collection intervals.

At step 217, the computer system 121 terminates the process of detecting the collection interval of the data received at step 202.

Figure 2C:
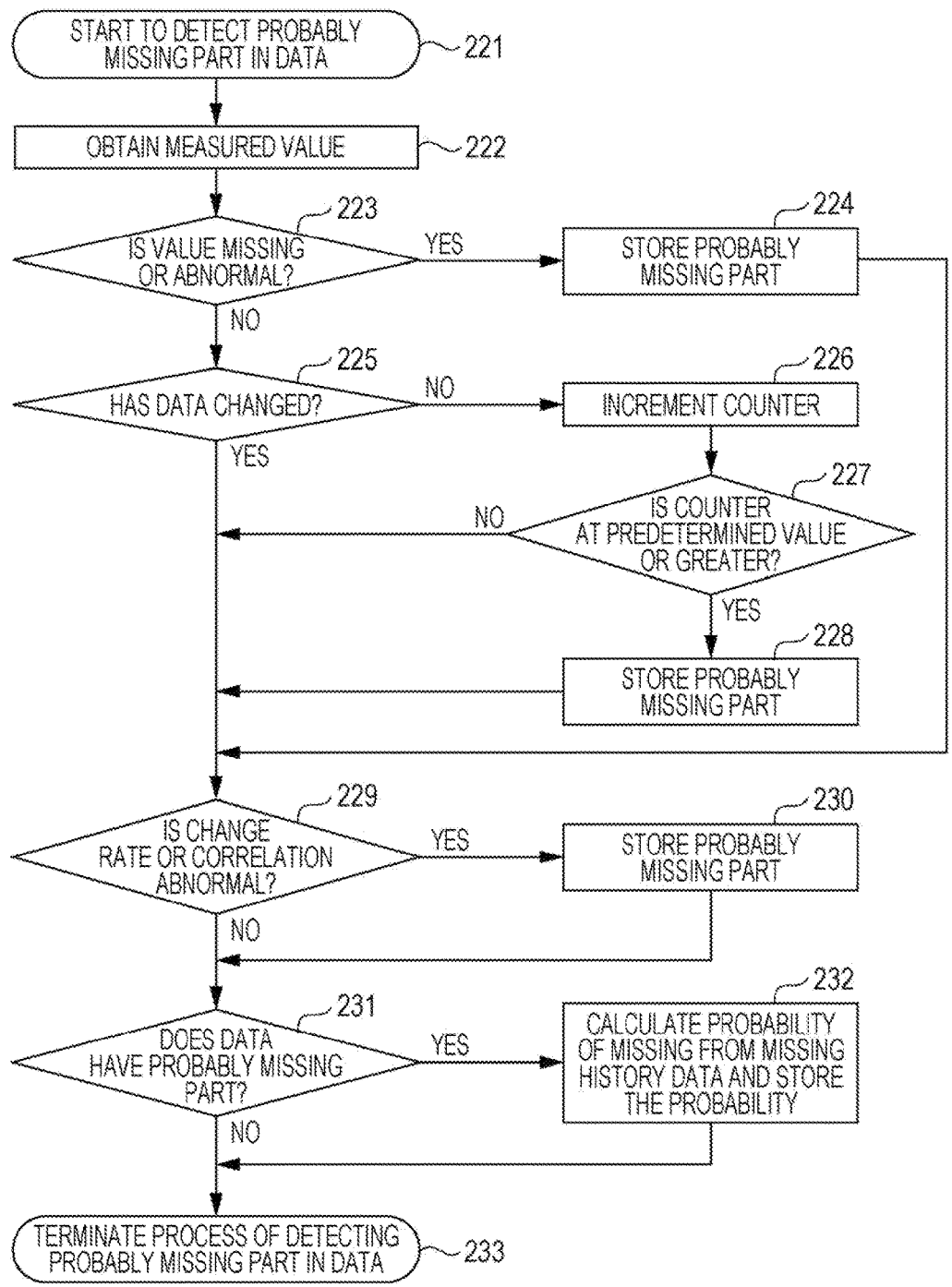
FIG. 2C is a flowchart, of the flowchart shown in FIG. 2A, for the process of detecting a probably missing part in the received data.

FIG. 2C is a flowchart, of the flowchart shown in FIG. 2A, for the process of detecting a probably missing part (step 205) in the data received at step 202.

At step 221, the computer system 121 starts the process of detecting a probably missing part in the data received at step 202. The computer system 121 reads missing history data for use in determining a probably missing part.

At step 222, the computer system 121 obtains data (or a measured value). The measured value may be a measured value sent from a sensor.

At step 223, the computer system 121 determines whether data with a missing value in a time series is present (i.e., whether data that should be present is missing) or whether the values in time series have an anomaly.

The computer system 121 can determine whether data with a missing value in a time series is present depending on whether data has a blank in a time series or whether data indicates null in a time series.

The computer system 121 can determine an anomaly in the data depending on whether, for example, an abnormally high value or low value is present or whether zero or a minus value (for example, −1) is present. The computer system 121 can make the determination by comparison with data that has already come or with reference to missing history data in which missing values are accumulated.

If data with a missing value in a time series is present or if an abnormal value is present, the computer system 121 goes to step 224. In contrast, if data with a missing value in a time series is absent or if an abnormal value is absent, the computer system 121 goes to step 225.

If data with a missing value in a time series is present or if an abnormal value is present, then at step 224 the computer system 121 stores the data with a missing value in a time series or the abnormal part, as a probably missing part, in a storage medium for storing a probably missing part, for example. The computer system 121 then goes to step 229.

At step 225, the computer system 121 determines whether the obtained data has changed from the previously obtained data. The computer system 121 can determine whether there is a change depending on whether the value has not changed for a fixed time (for example, for a time longer than the data detection interval of the sensor) or whether the value has not changed a predetermined number of data reception times or more). The fact that there is no change means that the same value continues, in which case the data can be determined to be a probably missing part. This is because the same value could be continuously transmitted due to a sensor trouble or a trouble in a device or transmission path related to the sensor.

If there is no change, the computer system 121 goes to step 226. In contrast, if there is a change, the computer system 121 goes to step 229.

If there is no change, then at step 226 the computer system 121 increments the counter.

If at step 227 the counter is at a predetermined value or greater, then the computer system 121 goes to step 228. In contrast, if the counter indicates a value less than the predetermined value, the computer system 121 goes to step 229.

If the counter indicates the predetermined value or greater, then at step 228 the computer system 121 stores the missing part of the data as a probably missing part in a storage medium for storing a probably missing part, for example. The computer system 121 then goes to step 229.

At step 229, the computer system 121 determines whether the change rate of the data is abnormal or whether the correlation between the data is abnormal.

The computer system 121 can determine whether the data change rate is abnormal depending on whether part of the data is missing or whether the change rate of the measured value of a specific device or unit differs from a normal value. Assuming that data is obtained from a vehicle, the measured value of a specific device or unit can be of a gear, rotational speed, or speed but is not limited thereto.

The computer system 121 can determine whether the correlation between the data items is abnormal depending on whether, for example, the correlation between a plurality of related attributes is abnormal (e.g., if the data is obtained from a vehicle, whether the correlation between an engine speed and oil pressure is abnormal).

If the correlation between the data items is abnormal, the computer system 121 goes to step 230. In contrast, if the correlation between the data is not abnormal, the computer system 121 goes to step 231.

If the correlation between the data items is abnormal, then, at step 230, the computer system 121 stores the abnormal part of the data as a probably missing part in a storage medium for storing a probably missing part, for example. The computer system 121 then goes to step 231.

At step 231, the computer system 121 determines whether the data has the probably missing part. If the data has the probably missing part, the computer system 121 goes to step 232. In contrast, if the data has no probably missing part, the computer system 121 goes to end step 233.

At step 232, the computer system 121 can obtain or calculate the probability (for example, percentage) of missing for each of the stored probably missing parts with reference to the missing history data accumulated in the past. If the data received at step 202 is of test driving or auto racing that is performed only in a predetermined course (for example, a company's circuit for test driving or a circuit for auto racing), the computer system 121 can calculate the possibility of missing for individual stored probably missing parts in comparison with values during driving (for example, lap calculation, normal lap, or pit lap).

If a value is missing in a time series or if an abnormal value is present (see step 223), the probability of missing can be 100%, for example.

Similarly, if there is no change between the obtained data and data obtained before (see step 225), the probability of missing can be X % (between 100% and 0%), for example.

Similarly, if the change rate of the data is abnormal (see step 229), the probability of missing can be Y % (between 100% and 0%), for example.

At step 232, the computer system 121 can calculate the ranges of influence of the individual stored probably missing parts. The computer system 121 can calculate which attribute of which report (for example, a failure, warning, or mere accumulation) is influenced by the part.

The computer system 121 stores the calculated probability of missing in a storage medium for storing the probability of missing, for example. The computer system 121 then goes to end step 233.

At step 233, the computer system 121 terminates the process of detecting a probably missing part in the data received at step 202.

The details of determination for storing a probably missing part are shown at steps 223, 225, and 229 in the flowchart shown in FIG. 2C. However, the details of determination are not limited to those shown at steps 223, 225, and 229; any other details may be added as appropriate. Examples of other details of determination include, for data obtained from a vehicle, differences among laps in test driving or auto racing, and for data obtained from an artificial satellite or space, differences among revolutions of the Earth.

Figure 2D:
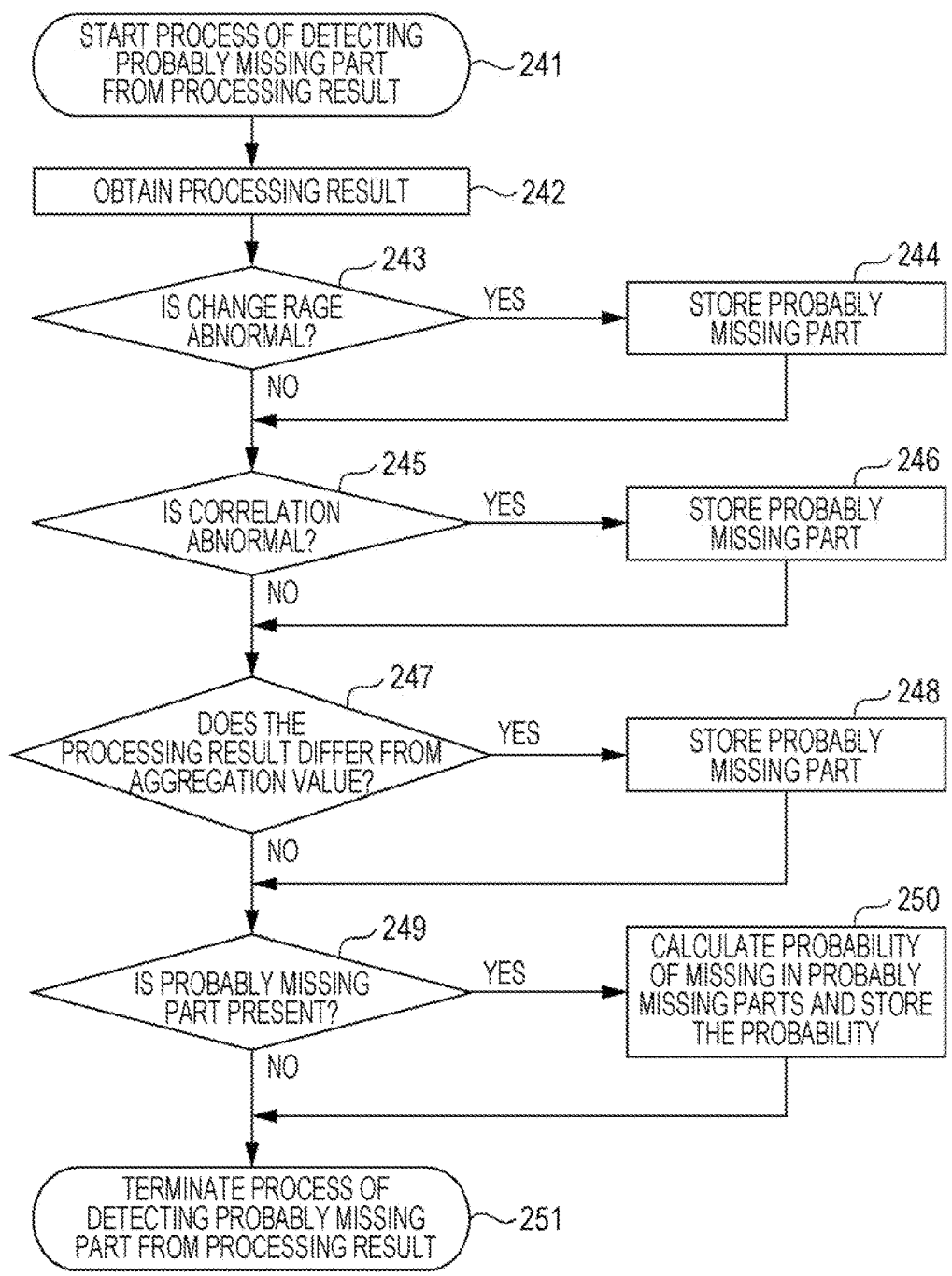
FIG. 2D is a flowchart, of the flowchart shown in FIG. 2A, for the process of detecting a probably missing part in the result of calculation.

FIG. 2D is a flowchart, of the flowchart shown in FIG. 2A, for the process of detecting a probably missing part in the result of calculation (step 206).

At step 241, the computer system 121 starts the process of detecting a probably missing part from the result of the stream processing at step 203.

At step 242, the computer system 121 obtains the result of the stream processing at step 203.

At step 243, the computer system 121 determines whether the change rate in the result obtained at step 242 is abnormal. If the change rate is abnormal, the computer system 121 goes to step 244. In contrast, if the change rate is not abnormal, the computer system 121 goes to step 245.

If the change rate is abnormal, then at step 244 the computer system 121 stores the part in the data as a probably missing part in the data in a storage medium for storing a probably missing part, for example. The computer system 121 then goes to step 245.

At step 245, the computer system 121 determines whether the correlation between the results obtained at step 242 is abnormal. If the correlation between the results is abnormal, the computer system 121 goes to step 246. In contrast, if the correlation between the results is not abnormal, the computer system 121 goes to step 247.

If the correlation between the results is abnormal, then at step 246 the computer system 121 stores the abnormal part as a probably missing part in a storage medium for storing a probably missing part, for example. The computer system 121 then goes to step 247.

At step 247, the computer system 121 determines whether the calculated values obtained by real-time stream processing at step 203 and the result obtained at step 242 differ from each other. If the calculated values and the result differ, the computer system 121 goes to step 248. In contrast, if the calculated values and the result do not differ, the computer system 121 goes to step 249.

If the calculated values and the result differ, then at step 248 the computer system 121 stores the different part as a probably missing part in, for example, a storage medium for storing a probably missing part. The computer system 121 then goes to step 249.

At step 249, the computer system 121 determines whether the probably missing part is present in the calculation result. If the probably missing part is present in the calculation result, the computer system 121 goes to step 250. If no probably missing part is present in the calculation result, the computer system 121 goes to end step 251.

At step 250, the computer system 121 can calculate the probability of missing (for example, percentage) for the stored individual probably missing parts with reference to the missing history data accumulated in the past. The probability of missing has been described at step 232 shown in FIG. 2C.

At step 250, the computer system 121 can calculate the ranges of influence of the individual stored probably missing parts. The computer system 121 can calculate which attribute of which report (for example, a failure, warning, or mere accumulation) is influenced by the part.

The computer system 121 stores the calculated probability of missing in, for example, a storage medium for storing the probability of missing. The computer system 121 then goes to end step 251.

At step 251, the computer system 121 terminates the process of detecting a probably missing part from the result of the stream processing at step 203.

Subsequently, if master data corresponding to the data received at step 202 and having no missing part is received, the computer system 121 may go to a process shown in FIG. 4.

Figure 3A:
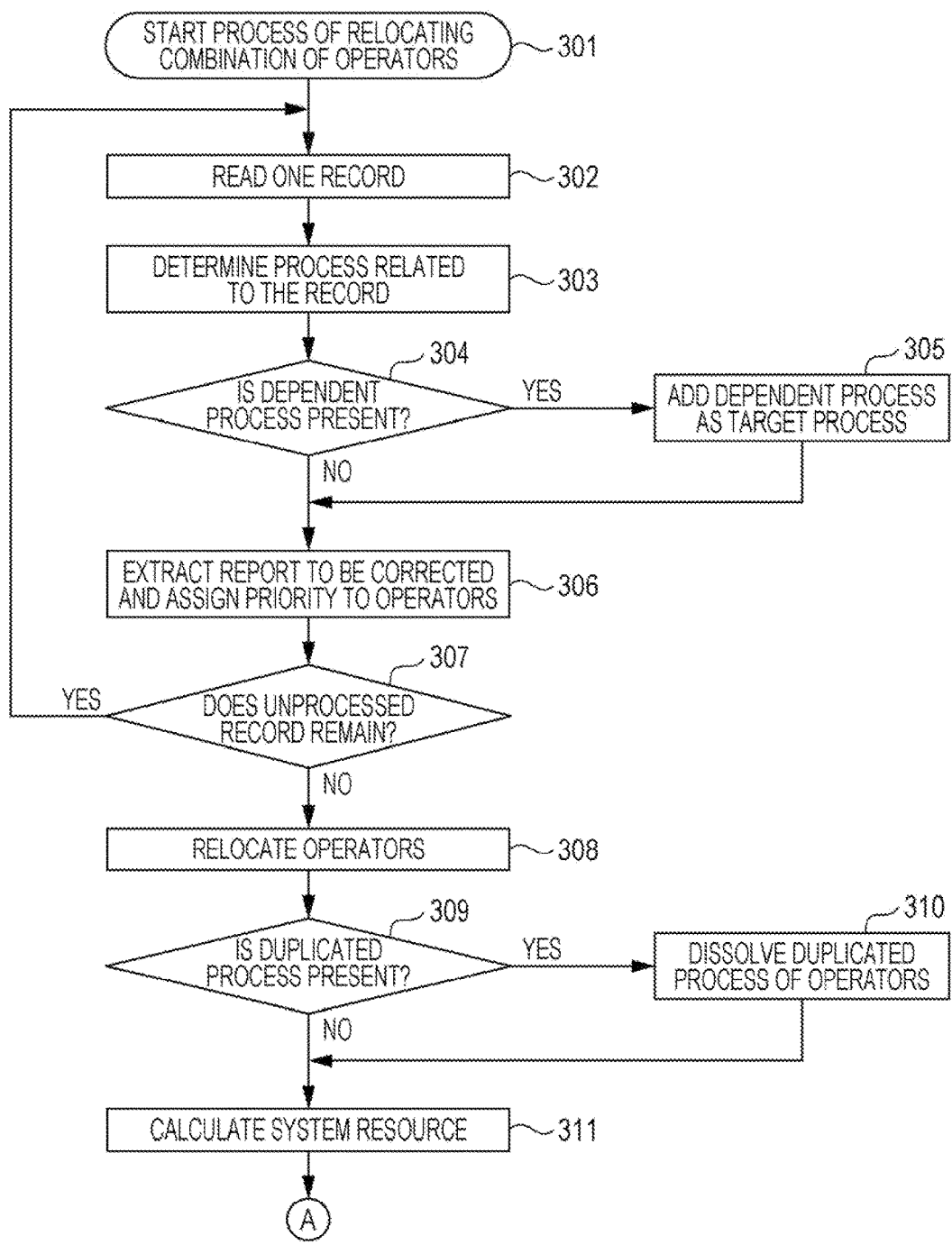
FIG. 3A is a flowchart for the process of relocating a combination of operators, each of which is one processing unit, according to an embodiment of the present disclosure.

FIGS. 3A and 3B show a flowchart for relocating a combination of operators, each of which is one processing unit, according to an embodiment of the present disclosure.

If the processes of the flowcharts shown in FIGS. 2A to 2D are completed, then at step 301 the computer system 121 may relocate the combination of operators in a first stream processing line used at step 203 in the flowchart shown in FIG. 2A and starts a process for generating a second stream processing line.

At step 302, the computer system 121 reads one record obtained as a result of the stream processing at step 203.

At step 303, the computer system 121 determines a process related to the record read at step 302.

At step 304, the computer system 121 determines whether a process that depends on the process determined at step 303 (for example, another process that depends on the process determined at step 303 and that is not determined at step 303) is present. An example of the dependent process can be a premise updating process for update or a process that further needs recalculation because of an updating process. If the dependent process is present, the computer system 121 goes to step 305. In contrast, if the dependent process is not present, the computer system 121 goes to step 306.

If the dependent process is present, then at step 305 the computer system 121 adds the dependent process as a process to be performed.

At step 306, the computer system 121 extracts a report to be corrected in the process of updating the result obtained by the stream processing at step 203 in FIG. 2A (see the flowchart in FIG. 4) from among reports output by the processes shown in FIGS. 2A to 2D (see step 208 in FIG. 2A) on the basis of the process determined at step 303 and the process added at step 305. The computer system 121 can assign the priority of process to a process associated with the extracted report. The computer system 121 can assign the priority to an operator associated with the extracted report in response to a request from a client (user) who needs the report. Alternatively, the computer system 121 may assign the priority to a process associated with the extracted report in response to a request from a client (user) who needs the report. Since the process associated with the extracted report is execution of one or a plurality of operators with the computer system 121, assigning the priority to the process, not to the operators, allows the same object that a report given higher priority to be output with higher priority.

At step 307, the computer system 121 determines whether an unprocessed record is present. If an unprocessed data is present, the computer system 121 returns to step 302 and repeats steps 302 to 307. If an unprocessed record is not present, the computer system 121 goes to step 308.

At step 308, the computer system 121 relocates the operators in the first stream processing line used at step 203 in the flowchart shown in FIG. 2A with reference to the report extracted at step 306 (for example, a report structure (505) shown in FIG. 5B) by updating the first stream processing line to construct the second stream processing line. That is, the computer system 121 relocates the operators by changing the combination of operators or by deleting unnecessary operators. If a process associated with the report extracted at step 306 is assigned a priority, the computer system 121 can relocate the operator in accordance with the priority. Thus, the operator can be relocated so that a high-priority result in the report is processed first.

At step 309, the computer system 121 determines whether there is a duplicate process for the operator relocated at step 308. If a duplicate process is present, the computer system 121 goes to step 310. In contrast, if a duplicate process is not present, the computer system 121 goes to step 311.

At step 310, the computer system 121 dissolves the duplicate process on the operator. The computer system 121 can delete a duplicate operator to prevent duplication.

At step 311, the computer system 121 can calculate a system resource for executing the relocated operator on the basis of the system resource obtained or calculated at step 203 in FIG. 2A, for example.

At step 312, the computer system 121 determines whether the system resource calculated at step 311 exceeds a given system resource. If the calculated system resource exceeds the given system resource, the computer system 121 goes to step 313. In contrast, if the calculated system resource does not exceed that of the given system resource, the computer system 121 goes to step 316.

If the calculated system resource exceeds the given system resource, then at step 313 the computer system 121 determines whether the system resource required to process the excessive operators can be reduced. Reducing the system resource required to process the excessive operators may include deleting part of the modules or subroutines of the operators. If the system resource can be reduced, the computer system 121 goes to step 314. In contrast, if the system resource cannot be reduced, the computer system 121 goes to step 315.

At step 314, the computer system 121 reduces the system resource assigned to an operator associated with the process and having low priority in accordance with the priory assigned to the process at step 306.

If the system resource cannot be reduced, then at step 315 the computer system 121 changes the parallel processing to serial processing (sequential operation).

At step 316, the computer system 121 calculates a predetermined time necessary for updating the result of the stream processing shown at step 203 in FIG. 2A on the basis of an actual processing time taken for the stream processing.

At step 317, the computer system 121 determines whether the predetermined time calculated at step 316 exceeds a given predetermined time (for example, given by a client (user) who needs the report). If the calculated predetermined time exceeds the given predetermined time, the computer system 121 goes to step 318. In contrast, if the calculated predetermined time does not exceed the given predetermined time, the computer system 121 goes to step 319.

If the calculated predetermined time exceeds the given predetermined time, then at step 318 the computer system 121 moves the operator associated with the process and having low priority downstream of the serial processing in accordance with the priority assigned to the process at step 306.

If the location of the operator relocated at step 308 needs to be changed at steps 315 and 318, then at step 319 the computer system 121 further changes the location of the operator and deploys the finally located combination of operators (the second stream processing line). That is, the computer system 121 compiles the finally located combination of operators for execution. The computer system 121 dispatches the operators to one or a plurality of cores in accordance with the final location.

At step 320, the computer system 121 can output the schedule of the process of updating the result of the stream processing (for example, a predetermined start time and end time) on the screen of the display 106 or in the form of a print or a file.

At step 321, the computer system 121 terminates the process of relocating the combination of operators to generate the second stream processing line.

FIG. 4 is a flowchart for the process of updating the result of the stream processing at step 203 in FIG. 2A using master data having no missing value corresponding to the data received at step 202 in FIG. 2A in accordance with an embodiment of the present disclosure.

At step 401, the computer system 121 starts the process of updating the result of the stream processing using the master data.

At step 402, the computer system 121 receives the master data. The computer system 121 receives the master data, for example, in the form of a file including all the data (in any file storage format). The received master data corresponds to the data received at step 202 in FIG. 2A, in which no value is missing. For example, if the received data is sent from a vehicle, the master data can be data that is extracted directly from a storage medium equipped in the vehicle.

At step 403, the computer system 121 extracts the data received at step 202 in sequence and determines whether the extracted data is data stored as a probably missing part. If the extracted data is data stored as a probably missing part, the computer system 121 goes to step 404. In contrast, if the extracted data is not data stored as a probably missing part, the computer system 121 goes to step 411.

At step 404, the computer system 121 compares the master data received at step 402 with the data with the probably missing part determined at step 403 to determine whether the probably missing part is really a missing part.

At step 405, the computer system 121 determines whether the probably missing part is an actually missing part from the comparison result. If the probably missing part is an actually missing part, the computer system 121 goes to step 406. In contrast, if the probably missing part is not an actually missing part, the computer system 121 goes to step 407.

If the probably missing part is an actually missing part, then at step 406 the computer system 121 updates history data in which missing history is stored to add information that the part is missing.

If the probably missing part is not an actually missing part, then at step 407 the computer system 121 updates the history data in which missing history is stored to add information that the part is not missing.

At step 408, the computer system 121 dispatches the master data to the second stream processing line deployed at step 319 in FIG. 3B to update the result of the stream processing performed at step 203 in FIG. 2A using the master data received at step 402. At the dispatch, the computer system 121 can dispatch only a part of the master data necessary for the second stream processing line to the second stream processing line.

At step 409, the computer system 121 processes the dispatched master data using the second stream processing line to obtain a result of processing the master data. The computer system 121 then updates the result of the stream processing performed at step 203 in FIG. 2A to the result of processing the master data.

At step 410, the computer system 121 updates updating-process status data indicating the update status. For example, the computer system 121 can update an updating process status displayed on the display screen to the latest update status or can update update-status data that stores the update status.

At step 411, the computer system 121 determines whether data having a probably missing part to be processed next is present. If data having a probably missing part to be processed next is present, the computer system 121 returns to step 403 and repeats steps 403 to 411. In contrast, if data having a probably missing part to be processed next is not present, the computer system 121 goes to end step 412.

At step 412, the computer system 121 terminates the process of updating the result of the stream processing using the master data.

FIGS. 5A to 5C show examples of data structures that can be used in an embodiment of the present disclosure. The data structures are examples of data structures that can be used in an embodiment of the present disclosure when the data is obtained from a vehicle during test driving or racing.

A data structure 501 shown in FIG. 5A is used to dynamically accumulate the collection interval of the data received from a sensor or device at step 202 in FIG. 2A. The data structure 501 is used in the process of step 204 in FIG. 2A and in the flowchart of its details shown in FIG. 2B. If the data collection interval is updated at step 216 in FIG. 2B, the computer system 121 stores the updated data collection interval in the data structure 501. The data structure 501 can include, for example, an ID (for example, an identifier for identifying a sensor or an identifier for identifying a periodic action), an attribute (for example, the type of data obtained from the sensor), and an interval (for example, the collection interval of the sensor). The data structure 501 is stored in a storage medium 782 for storing the data collection interval shown in FIGS. 7A and 7B, for example.

A data structure 502 shown in FIG. 5A is used to accumulate a past missing history. The data structure 502 is used to detect a probably missing part in the processes of steps 205 and 206 shown in FIG. 2A and the flowcharts shown in FIGS. 2C and 2D showing the details thereof. The data structure 502 can include, for example, the type of the probability of missing (for example, the cause of missing), an attribute (for example, the attribute of data having a probably missing part), the range of a value (for example, the range of a probably missing value), a condition (for example, a condition for determining the probability of missing), and the probability of missing (the probability of missing in which an actually missing rate is factored). The data structure 502 is stored in, for example, a storage medium 783 for storing the missing history shown in FIGS. 7A and 7B.

A data structure 503 shown in FIG. 5A is used to store data or a data set that may have a missing part. The data structure 503 is used at step 205 and 206 shown in FIG. 2A and in the processes of the flowcharts shown in FIGS. 2C and 2D for the details thereof. When a probably missing part is detected at steps 224, 228, or 230 shown in FIG. 2C or steps 244, 246, or 248 shown in FIG. 2D, the computer system 121 stores the detected probably missing part in the data structure 503. The data structure 503 can include, for example, an attribute (for example, an event or device that is determined to have a missing part), a range (for example, a time zone during which missing data can occur), the type of missing (for example, the cause of missing), data volume, and the probability of missing (probability of determination of missing). The data structure 503 is stored in a storage medium 784 for storing a probably missing part shown in FIGS. 7A and 7C, for example.

A data structure 504 shown in FIG. 5B is used to store a system resource and a processing time required for stream processing at step 203 shown in FIG. 2A. The data structure 504 is also used to calculate a system resource and a processing time necessary for updating the result of stream processing using the master data. The data structure 504 can include, for example, an operator group (for example, a process in which the operator or operator group is used), the number of processed data items (for example, the number of data items processed by the operator or operator group), the number of processed attributes (for example, the number of attributes processed by the operator or operator group), an assigned system resource (for example, a system resource assigned to the operator or operator group: for example, the number of cores or a memory capacity), and a processing time (a processing time taken to execute the process). The data structure 504 is stored in a storage medium 785 for storing the processing time result and the system resource shown in FIGS. 7A and 7B, for example.

A data structure 505 shown in FIG. 5B shows which process of which attribute (corresponding to the type in the data structure 505) is used to analyze which report. The data structure 505 is used to extract a report to be corrected at step 306 in FIG. 3A. The data structure 505 can include, for example, an attribute (for example, an event or device that is determined to have a probably missing part), a type (for example, an attribute type), a sampling interval (for example, the reception or transmission interval of data sent from a sensor or device), an analysis (for example, the details of analysis associated with the attribute), and a report (for example, the details of analysis reported). The data structure 505 is stored in a storage medium 786 for storing a report shown in FIG. 7B, for example.

A data structure 506 shown in FIG. 5B shows which analysis and attribute of which report has higher priority. The data structure 506 can be used to store the order of priority assigned to the report extracted at step 306. The data structure 506 can also be used to determine a system resource of the operator at steps 315 and 318 in FIG. 3B. The data structure 506 can include, for example, a report (for example, a trouble to be analyzed), an analysis (for example, an analysis associated with the attribute) an attribute (for example, an event or device described in the report), and the order of priority (for example, the priority of the process). The data structure 506 can be stored in a storage medium 787 for storing the priority of processing shown in FIG. 7B, for example.

A data structure 507 shown in FIG. 5C shows the kind of the updating process (output data) for updating the result of the stream processing performed at step 203 in FIG. 2A (see the flowchart in FIG. 4). The data structure 507 can include, for example, an operator group (for example, a process in which the operator or operator group is used), an output attribute (for example, an attribute output by the updating process), the type of an output attribute (for example, the type of an attribute output by the process), a sampling interval (for example, the reception or transmission interval of data sent from a sensor or device), and a dependent operator (for example, an operator having a dependency relationship with the operator). The data structure 507 is stored in a storage medium 788 for storing an updating process shown in FIG. 7B, for example.

A data structure 508 shown in FIG. 5C shows the update status of the updating process for updating the result of the stream processing performed at step 203 in FIG. 2A (see the flowchart shown in FIG. 4). The data structure 508 is used to update updating-process status data indicating the update status at step 411 in FIG. 4. The data structure 508 can include, for example, a report (for example, a trouble to be analyzed), an analysis (for example, the details of an analysis associated with the attribute), an attribute (for example, an event or device described in the report), an updating process status (for example, the progress situation of the update), and an estimated processing time (for example, a predetermined update end time). The data structure 508 is stored in a storage medium 791 for storing an updating process status shown in FIG. 7C, for example.

Figure 6A:
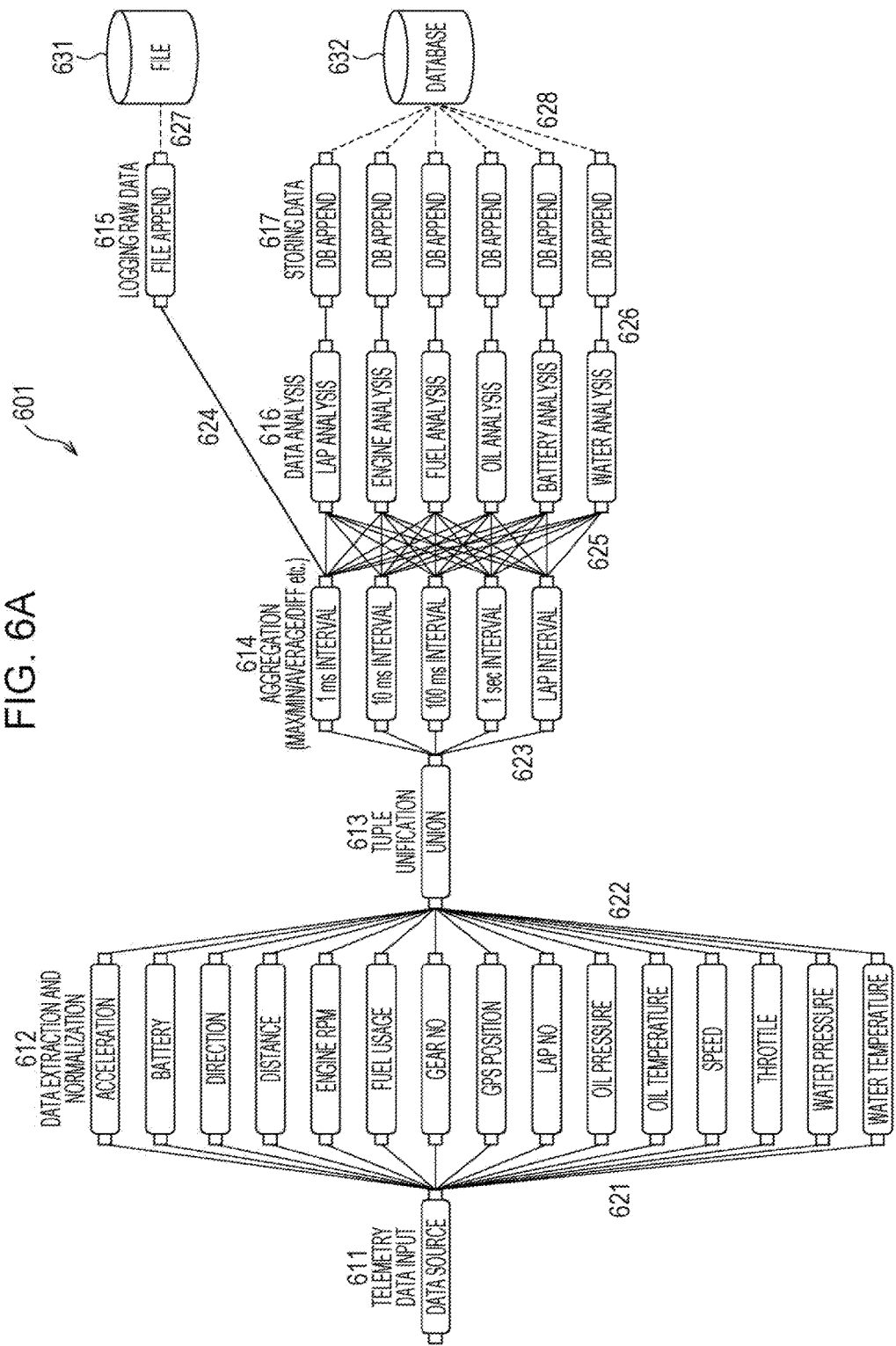
FIG. 6A is a diagram showing a stream processing line (a first stream processing line) that can be used for the real-time stream processing of the received data according to an embodiment of the present disclosure.

FIG. 6A shows a first stream processing line 601 that can be used for real-time stream processing of data received at step 202 in FIG. 2A according to an embodiment of the present disclosure.

The first stream processing line 601 allows stream processing by establishing connections 621, 622, 623, 624, 625, 626, 627, and 628 between the inputs/outputs of operators and operator groups 611, 612, 613, 614, 615, 616, and 617. The computer system 121 can output the result of real-time stream processing of the data received at step 202 in FIG. 2A using the first stream processing line 601 in the form of a file 631 or can output the result to a database 632.

Figure 6B:
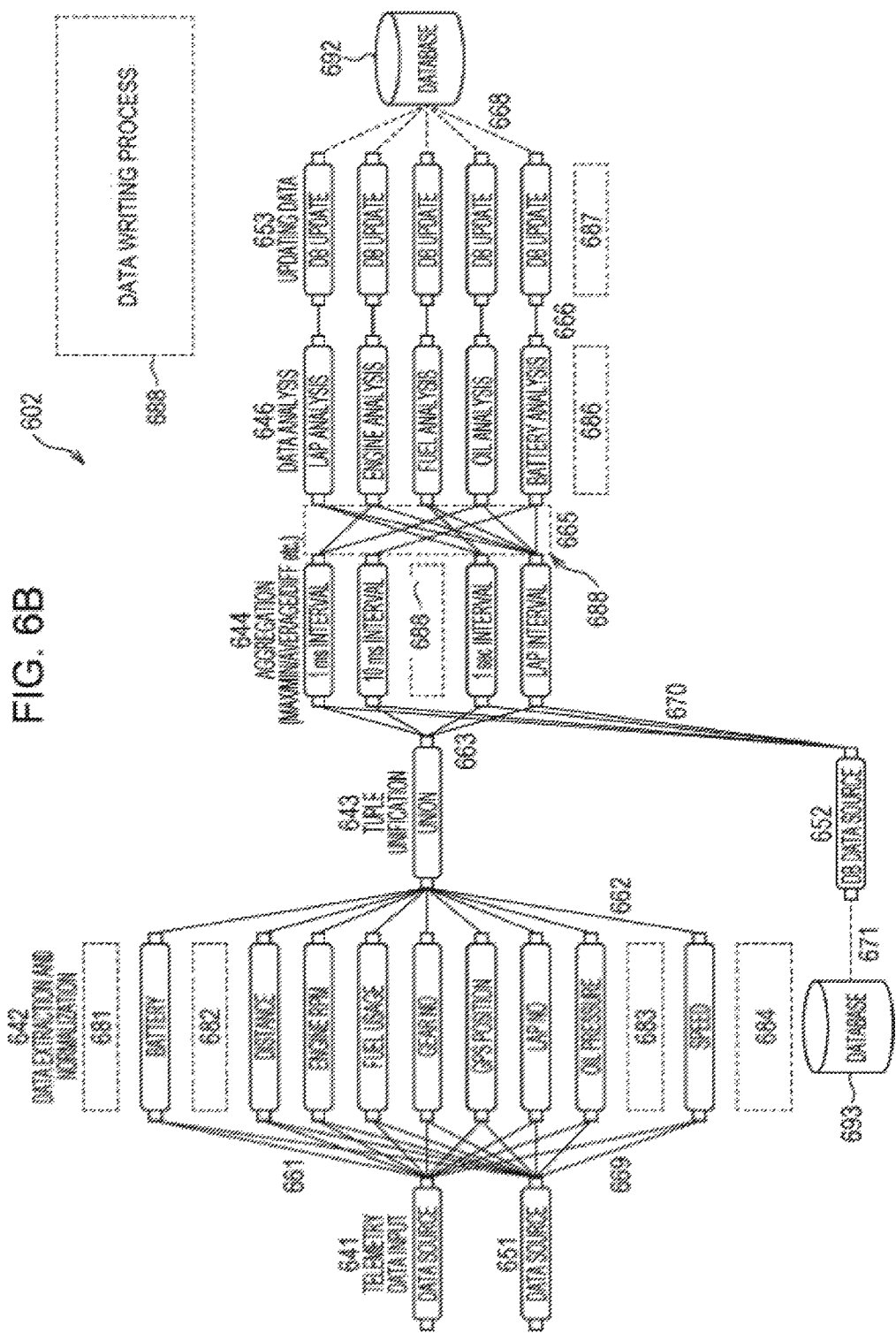
FIG. 6B is a diagram showing a stream processing line (a second stream processing line) that can be used for the process of updating the result of the stream processing using the master data according to an embodiment of the present disclosure.

FIG. 6B shows a second stream processing line 602 that can be used for the process of updating the result of the stream processing performed at step 203 in FIG. 2A using the master data received at step 402 in FIG. 4 according to an embodiment of the present disclosure.

The second stream processing line 602 allows stream processing by establishing connections 661, 662, 663, 665, 666, 669, and 670 between the inputs/outputs of operators and operator groups 641, 642, 643, 644, 646, 651, 652, and 653.

The second stream processing line 602 is obtained by relocating the operators and the operator groups in the first stream processing line 601 shown in FIG. 6A. The relocation can include deletion, addition, sorting of the operators or operator groups, or combinations thereof.

In the second stream processing line 602, operators that are determined to be unnecessary for master-data stream processing for update are deleted from the first stream processing line 601 shown in FIG. 6A (an operators "Acceleration" 681, an operator "Direction" 682, an operator "Oil Temperature" 683, an operator "Throttle" an operator "Water Pressure" 684, an operator "100 ms Interval" 685, an operator "Water Analysis" 686, and an operator "DB Append" 687.

Furthermore, in the second stream processing line 602, the connection (stream) 665 (see the connection 625 shown in FIG. 6A) that is determined to be unnecessary for master data stream processing for update is deleted.

Furthermore, in the second stream processing line 602, the data writing process 688 (see the operator 615, the connection 627, and the file 631) which is unnecessary for the master data stream processing for update is deleted to save the system resource for update.

Furthermore, the second stream processing line 602 includes an additional operator "Data Source" 651. The operator "Data Source" 651 is added to enhance the degree of parallelism and takes charge of input and intermediate processing.

The second stream processing line 602 further includes an additional operator "DB Data Source" 652. The operator "DB Data Source" 652 is added to use a valid part of calculated data. This valid part of the calculated data may be obtained from database 693 via connection 671.

In the second stream processing line 602, the operator group "DB Append" (see the operator group 617 in FIG. 2A) is changed to the operator group "Db Update" 653 to change the operator type as needed. The first stream processing line 601 includes the data appending process because no data is stored in the database 632, whereas the second stream processing line 602 is for updating data stored in the database 632 (corresponding to a database 692 in FIG. 6B) in the first stream processing line 601 and does not need the appending process, and thus the appending process is changed to the updating process.

Figure 7A:
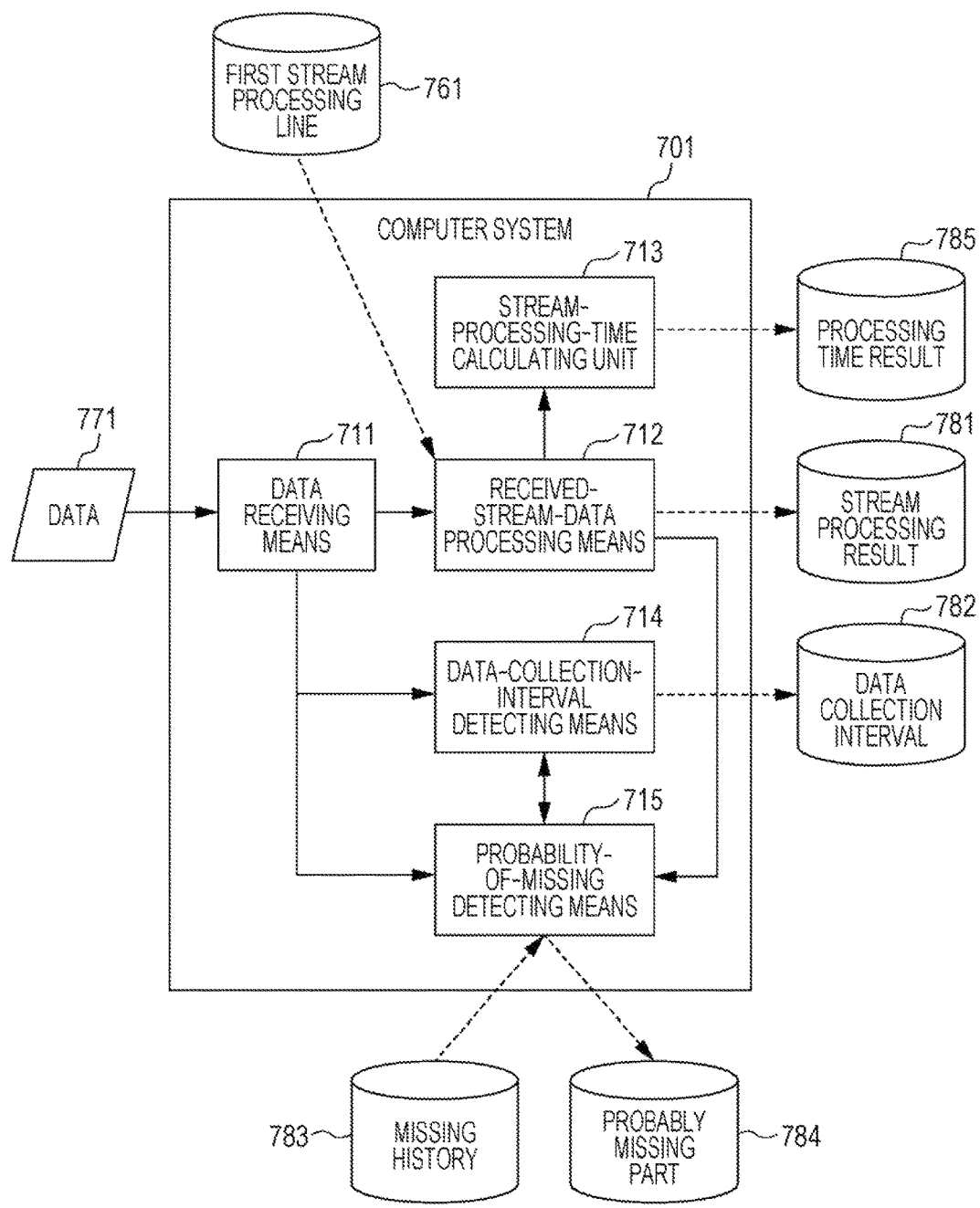
FIG. 7A is an example diagram of a functional block diagram of a computer system that preferably has the hardware configuration shown in FIG. 1A or 1B, for detecting a probably missing part in the received data while processing the received stream data in real time according to an embodiment of the present disclosure.
Figure 7B:
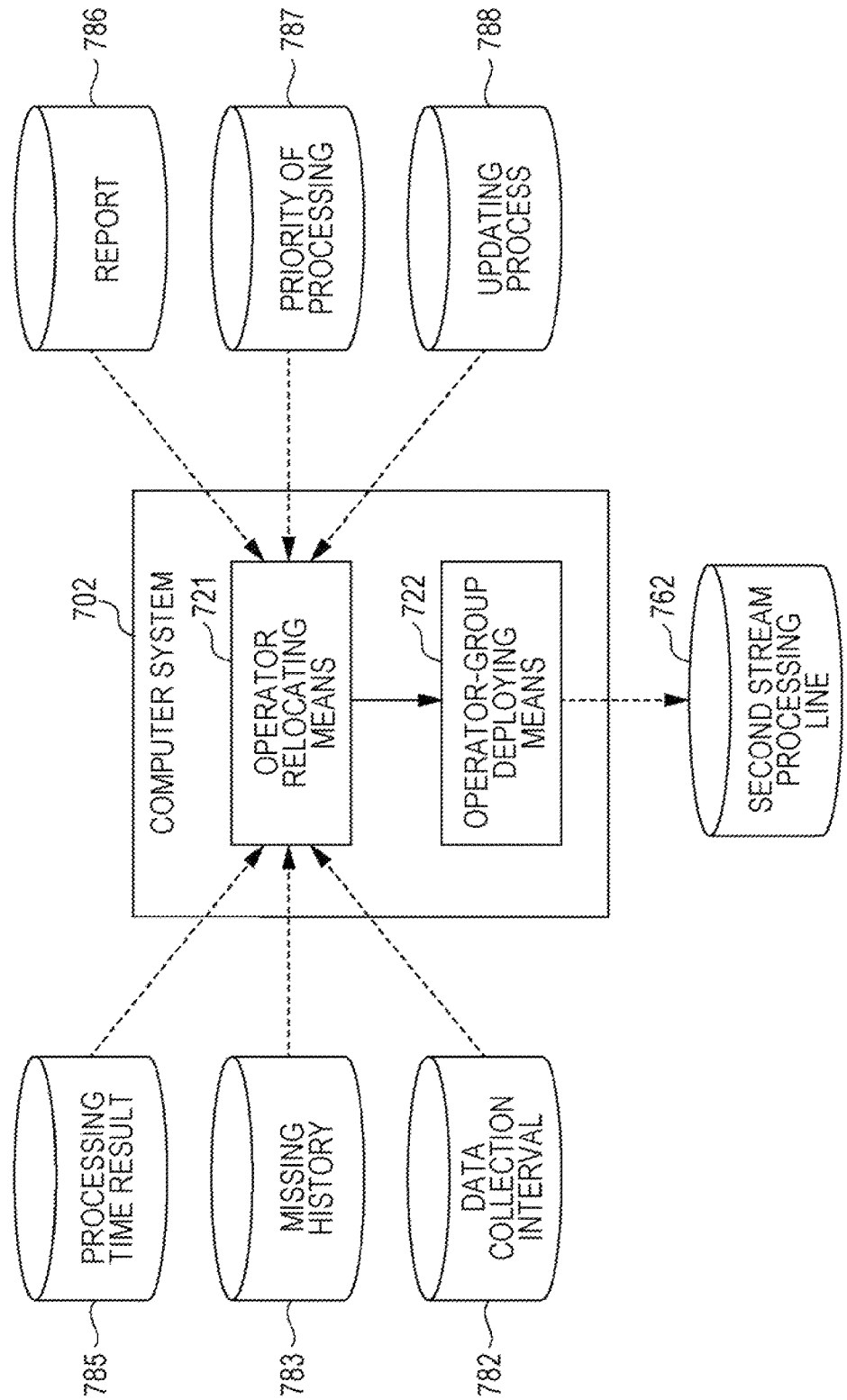
FIG. 7B is an example diagram of a functional block diagram of a computer system that preferably has the hardware configuration shown in FIG. 1A or 1B, for relocating a combination of operators for use in updating the result of the stream processing to define a stream processing line (a second stream processing line) for use in the updating process according to an embodiment of the present disclosure.
Figure 7C:
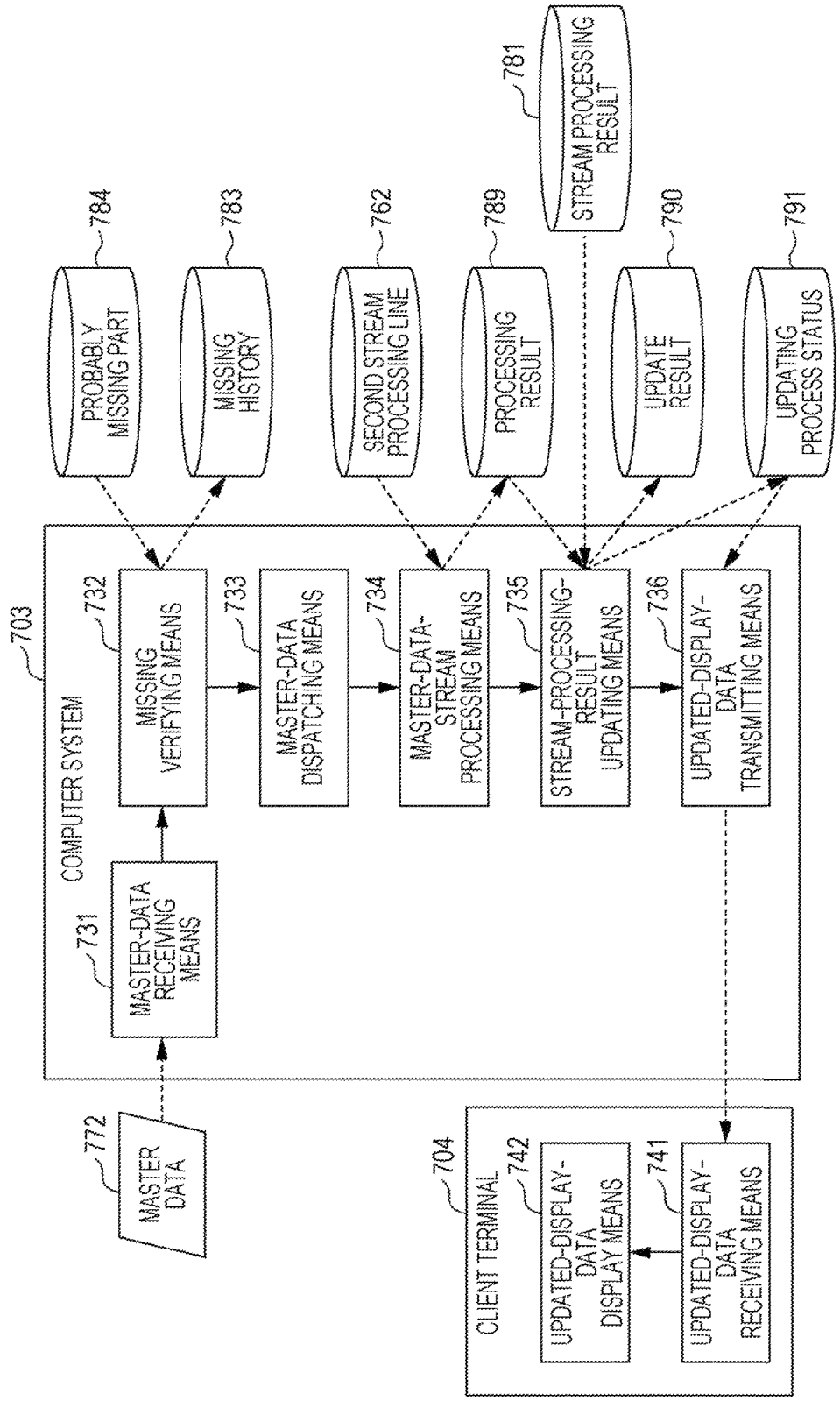
FIG. 7C is an example diagram of a functional block diagram of a computer system that preferably has the hardware configuration shown in FIG. 1A or 1B, for comparing the master data and a probably missing part, and if the received data has a missing part, updating the result of the stream processing using the master data according to an embodiment of the present disclosure.

FIGS. 7A to 7C show examples of functional block diagrams of computer systems that preferably have the hardware configuration shown in FIG. 1A or 1B for processing data according to some embodiments of the present disclosure.

FIG. 7A is an example diagram of a functional block diagram of a computer system for detecting a probably missing part in received data while processing the received stream data in real time according to an embodiment of the present disclosure.

The computer system 701 can include the hardware configuration 101 shown in FIG. 1A or the hardware configuration 121 shown in FIG. 1B.

The computer system 701 includes data receiving means 711, received-stream-data processing means 712, a stream-processing-time calculating unit 713, data-collection-interval detecting means 714, and probability-of-missing detecting means 715.

The data receiving means 711 receives data 771, for example, stream data.

The data receiving means 711 can execute the process of step 202 shown in FIG. 2A.

The received-stream-data processing means 712 processes the stream data 771 that the data receiving means 711 received in real time. The received-stream-data processing means 712 executes stream processing of the data 771 that the data receiving means 711 received in the first stream processing line (see 761) which is a combination of a plurality of operators each of which is a processing unit.

The received-stream-data processing means 712 can store the result of the stream processing in a storage medium 781 for storing the result of the stream processing, for example.

The received-stream-data processing means 712 can execute the process of step 203 shown in FIG. 2A.

The stream-processing-time calculating unit 713 outputs a processing time required for the operators to perform the stream processing or a system resource required for the operators to perform the stream processing, or a combination thereof. The stream-processing-time calculating unit 713 can store the processing time, the system resource, or the combination thereof in the storage medium 785 for storing the processing time and the system resource, for example.

The stream-processing-time calculating unit 713 can calculate a processing time or a system resource required for the operators to perform stream processing at the process of step 203 in FIG. 2A.

If the data 771 that the data receiving means 711 received is measured values sent from at least one sensor, the data-collection-interval detecting means 714 detects the collection interval of the measured values.

The data-collection-interval detecting means 714 can store the collection interval in the storage medium 782 for storing the collection interval, for example.

The data-collection-interval detecting means 714 can execute the process of step 204 in FIG. 2A and the processes of the steps in FIG. 2B.

The probability-of-missing detecting means 715 detects a probably missing part in the data 771 that the data receiving means 711 received while the received-stream-data processing means 712 is processing the stream data 771 in real time. The probability-of-missing detecting means 715 can refer to the data missing history data (see 783) to detect a probably missing part.

The probability-of-missing detecting means 715 further outputs the range of the probably missing part, the probability of missing, the type of missing, the range of influence of the processing result due to the missing, the order of priority of output of the processing result, the dependency relationship among operators when the stream processing is executed in a stream processing line that is a combination of a plurality of operators each of which is one processing unit, a processing time required for the operators to perform the stream processing, a system resource required for the operators to perform the stream processing, or a combination thereof.

If the data 771 that the data receiving means 711 received is measured values sent from at least one sensor, the probability-of-missing detecting means 715 detects the probably missing part using the measured values or using values calculated by the stream processing in real time.

In the case where the data 771 that the data receiving means 711 received indicates measured values from at least one sensor, if a difference in the collection interval among the measured values is detected, the probability-of-missing detecting means 715 detects a part of the data in which the difference is detected as a probably missing part.

If the received data has a missing value in a time series, if the received data has an abnormal value, if the received data has a value that does not change for a fixed time, if the received data has a value whose change rate is abnormal, if the collection interval of the sensor changes, if the correlation among a plurality of related attributes (for example, the degree of correlation) is abnormal, or if a value obtained by comparing differences among values obtained from repeated actions is abnormal or with reference to the missing history data in which a missing history is stored (see 783), the probability-of-missing detecting means 715 detects the probably missing part. Examples of the values obtained by the repeated actions can include an average value, the maximum value, the minimum value, and accumulated values, but the values are not limited thereto. An example of the differences among values obtained by repeated actions can be a difference between values obtained by repeated actions and a normal value.

The probability-of-missing detecting means 715 can also execute the process of step 205 in FIG. 2A, the processes of the steps in FIG. 2C, the process of step 206 in FIG. 2A, and the processes of the steps in FIG. 2D.

FIG. 7B is an example diagram of a functional block diagram of a computer system that preferably has the hardware configuration shown in FIG. 1A or 1B, for relocating a combination of operators for use in updating the result of the stream processing to define a stream processing line (a second stream processing line) for use in the updating process according to an embodiment of the present disclosure.

A computer system 702 can have the hardware configuration 101 shown in FIG. 1A or the hardware configuration 121 shown in FIG. 1B. The computer system 702 may have either the same hardware as that of the computer system 701 or different hardware.

The computer system 702 includes operator relocating means 721 and operator-group deploying means 722.

The operator relocating means 721 relocates a combination of operators for use in updating the result of stream processing performed by the received-stream-data processing means 712 to define a second stream processing line for use in the updating process.

The operator relocating means 721 determines the relocation of a combination of operators in accordance with the probability of missing, the type of missing, the range of influence of the processing result due to the missing part, the order of priority of output of the processing result, the dependency relationship among the operators, a processing time available for the update, a system resource available for update (for example, the number of cores or a memory capacity), or a combination thereof.

If the processing time available for update, the system resource available for update (see 785), or a combination thereof is limited, the operator relocating means 721 determines the relocation of the combination of operators in accordance with the order of priority of output of the processing result.

Alternatively, the operator relocating means 721 determines the relocation of the operators in accordance with a report (see 786), the priority of processing (see 787), an updating process (see 788), a processing time result (see 785), a system resource (see 785), a missing history (see 783), a data collection interval (see 782), or a combination thereof.

The operator relocating means 721 can execute the processes of steps 302 to 318 and 320 shown in FIGS. 3A and 3B.

The operator-group deploying means 722 deploys the combination of operators relocated by the operator relocating means 721 (the second stream processing line).

The operator-group deploying means 722 further includes location means (not shown) for locating the relocated operators on a plurality of processor nodes or a plurality of virtual processor nodes on the computer system.

Furthermore, the operator-group deploying means 722 can execute the process of step 319 in FIG. 3B.

FIG. 7C is an example diagram of a functional block diagram of a computer system that preferably has the hardware configuration shown in FIG. 1A or 1B, for comparing master data having no missing part and corresponding to the received data having a probably missing part, and if the received data has a missing part, updating the result of the stream processing using the master data according to an embodiment of the present disclosure.

A computer system 703 can have the hardware configuration 101 shown in FIG. 1A or the hardware configuration 121 shown in FIG. 1B. The computer system 703 may have either the same hardware as that of the computer system 701 or different hardware. Similarly, the computer system 703 may have either the same hardware as that of the computer system 702 or different hardware.

The computer system 703 includes master-data receiving means 731, missing verifying means 732, master-data dispatching means 733, master-data-stream processing means 734, stream-processing-result updating means 735, and updated-display-data transmitting means 736.

The master-data receiving means 731 receives master data 772 corresponding to data that the data receiving means 711 received and having no missing part. The master-data receiving means 731 receives the master data 772 in the form of a file including potentially all the data (in any file storing format).

The master-data receiving means 731 can execute the process of step 402 in FIG. 4.

The master-data receiving means 731 may be the same as the data receiving means 711 shown in FIG. 7A.

The missing verifying means 732 compares the master data 772 that the master-data receiving means 731 received with the probably missing part (see 784) detected by the probability-of-missing detecting means 715 to verify the presence of the missing part.

If the data has the missing part, the missing verifying means 732 records the missing part in data in which a missing history is accumulated (missing history data) 783, for example.

The missing verifying means 732 can also execute the processes of steps 403 to 407 and 411 shown in FIG. 4.

The master-data dispatching means 733 dispatches the master data 772 to the second stream processing line deployed by the operator-group deploying means 722 to update the result of the stream processing performed by the received-stream-data processing means 712 using the master data 772 that the master-data receiving means 731 received.

The master-data dispatching means 733 can execute the process of step 408 shown in FIG. 4.

The master-data-stream processing means 734 executes a process on the master data 772 that the master-data receiving means 731 received (basically, stream processing, or a serializing process) in the deployed second stream processing line (see 762), which is obtained by relocating the first stream processing line. The master-data-stream processing means 734 can store the result of processing in a recording medium 789 for storing the processing result, for example.

If the data has a missing part, the master-data-stream processing means 734 processes the master data 772 so as to update the result of the missing part.

The master-data-stream processing means 734 processes the stream data that the data receiving means 711 received in real time. Furthermore, the received-stream-data processing means 712 executes stream processing on the data that the data receiving means 711 received in the first stream processing line that is a combination of a plurality of operators each of which is one processing unit.

The master-data-stream processing means 734 processes the dispatched master data 772 at step 409 in FIG. 4 using the second stream processing line to obtain the result of processing on the master data 772.

The master-data-stream processing means 734 may be the same as the received-stream-data processing means 712 shown in FIG. 7A.

The stream-processing-result updating means 735 updates the result of the stream processing (see 781) performed by the received-stream-data processing means 712 using the master data 772 that the master-data receiving means 731 received. The stream-processing-result updating means 735 reads the result of the processing (see 789) performed by the master-data-stream processing means 734 and updates the result of the stream processing (see 781) performed by the received-stream-data processing means 712 using the read processing result. In other words, the update is correction of the result of the stream processing performed by the received-stream-data processing means 712 (see 781) with the result of processing performed by the master-data-stream processing means 734 (see 789).

The stream-processing-result updating means 735 updates the result of the stream processing performed by the received-stream-data processing means 712 using the result of the stream processing performed by the master-data-stream processing means 734.

The stream-processing-result updating means 735 can calculate the difference between the result of stream processing performed by the received-stream-data processing means 712 and the result of processing performed by the master-data-stream processing means 734 and correct the result of the stream processing performed by the received-stream-data processing means 712 using the calculated difference.

If the data that the data receiving means 711 received is measured values sent from at least one sensor, the stream-processing-result updating means 735 updates, of the results of the stream processing, a result of missing due to a difference in collection interval using the result of processing on the master data 772.

The stream-processing-result updating means 735 can store the update result in a storage medium 790 for storing update results, for example. The stream-processing-result updating means 735 can store a report that shows an update status in a storage medium 791 for storing an update status report, for example.

The stream-processing-result updating means 735 updates the update status report in real time. The update status report may include a report indicating that the update is completed, a report indicating that the data has no missing part, and a report indicating a predetermined update completion time or the progress of the update.

If the update cannot be completed within an allowable processing time for update, the stream-processing-result updating means 735 stops the updating process and marks an unupdated part in response to stopping the updating process.

At step 409 in FIG. 4, the stream-processing-result updating means 735 updates the result of the stream processing at step 203 in FIG. 2A using the result of the processing performed by the master-data-stream processing means 734.

The stream-processing-result updating means 735 can execute the process of step 410 in FIG. 4.

The updated-display-data transmitting means 736 transmits the processing result updated by the stream-processing-result updating means 735 and/or the updating process status to a client terminal 704 that requests the updated processing result and/or updating process status.

The client terminal 704 includes updated-display-data receiving means 741 and updated-display-data display means 742.

The updated-display-data receiving means 741 receives the updated processing result and/or updating process status transmitted from the updated-display-data transmitting means 736.

The updated-display-data display means 742 outputs the updated processing result and/or updating process status that the updated-display-data receiving means 741 received on the screen of the display 106 or in the form of a print or a file.

An example scenario is provided herein. In this example, for vehicle performance evaluation, test driving is employed which can be performed only in a predetermined course (for example, a company's circuit for test driving or a circuit for auto racing).

A development team for a vehicle manufacturer is scheduled to conduct test driving for evaluating the performance of a vehicle through a predetermined number of driving laps around a predetermined course. In the test driving, the first test driving is performed in the morning, and after the first test driving, the second test driving is performed in the afternoon using the vehicle adjusted on the basis of the result of the first test driving.

The vehicle is equipped with a plurality of sensors, so that data from the sensors can be transmitted to a remote computer in real time via a wireless network during test driving.

However, the data transmitted using the predetermined course (in particular, the circuit) is sometimes lost in the transmission path because the communication through the predetermined course is unstable, because the data is transmitted through a path unique to the predetermined course (a receiver, a storage, and a transmitter), because the vehicle is driving at high speed, because other communicating vehicles are present, and because the communication line is not a dedicated line but is shared by the other vehicles.

The remote computer can transmit the data received from the sensors over a wireless or wired network to a computer system according to an embodiment of the present disclosure.

The vehicle development team who supports the test driving can receive the result of processing transmitted from the computer system with a client terminal of the team in real time during the test driving. The vehicle development team needs to receive the processing result in real time to give various instructions to the driver or engineers during the test driving.

It is assumed that the first morning test driving is started at nine o'clock.

The vehicle transmits data to the remote computer in real time. If the remote computer receives the data, the remote computer transmits the received data to the computer system in real time.

If the computer system receives the data, the computer system processes the received stream data in real time. The computer system performs stream processing to detect a probably missing part in the received data in accordance with the flowcharts shown in FIG. 2B to FIG. 2D and detect a probably missing part in the data subjected to the stream processing. Part of the received data is missing in the transmission path.

The computer system transmits the result of the stream processing (for example, observation of measured values, alert analysis, correlation analysis, or trend analysis) to the client terminal in real time via the remote computer, for example. It can be said that the result of the stream processing is a false result because the received data has the missing part.

The vehicle development team can give various instructions to the driver or engineers while viewing the false result (a result during test driving) on the display of the client terminal.

It is assumed that the morning test driving ends at 11:30 AM.

The vehicle development team extracts the data (master data) transmitted from the sensors from the vehicle using a safe method (for example, via a physical recording medium, such as a USB memory). The extracted data is transmitted to the computer system over a stable normal Internet line.

When the first morning test driving ends, the computer system relocates the operators in the stream processing line used in the stream processing according to the flowcharts shown in FIGS. 2B to 2D and deploys the relocated operators.

It is assumed that the second test driving in the afternoon is started at 12 o'clock.

The computer system needs to update the result of the stream processing using the master data in accordance with the flowchart shown in FIG. 4 within a limited time after completion of the first morning test driving (for example, 10 to 20 minutes). For the update, the computer system is given enough system resources to analyze data about two hours of first morning test driving in two hours. The limited system resource is enough to analyze the two hours of first morning test driving in two hours but is not enough to analyze the master data on the two hours of first morning test driving (that is, two hours of data) in the limited time described above.

The computer system transmits the update result to the vehicle development team within the limited time using the limited system resource before the second afternoon test driving is started. It can be said that the update result is the last result because it is updated from the false result using the master data having no missing part.

The vehicle development team receives the last result before the second afternoon test driving is started. The vehicle development team takes measures for the second afternoon test driving after viewing the last result on the display of the client terminal.

According to an embodiment of the present disclosure, the vehicle development team can receive, not the false result obtained by processing stream data including a missing part within a limited time after completion of the first morning test driving and before the second afternoon test driving is started, but the updated last result using the master data having no missing part. This allows the vehicle development team to give various instructions for the second afternoon test driving to the driver or engineers on the basis of the last result.

Although the above example has been described as applied to test driving in vehicle development, it will be obvious to those skilled in the art that the above embodiments of the invention claimed in the application concerned are applicable to test driving in airplane development and train development (for example, bullet trains and linear motor cars). Similarly, it will also be obvious to those skilled in the art that the above embodiments of the invention claimed in the application concerned are applicable to auto racing in a circuit. Many other embodiments for other applications are also contemplated.

What is claimed is:

1. A method for processing data, the method comprising:
   receiving, by a processor of a computing system, data;
   detecting, by the processor of the computing system, a probably missing part in the received data while stream-processing of the received data in real time by:
      stream processing of the received data in a first stream processing line that is a combination of a plurality of operators, each operator of the plurality of operators being one processing unit;
   comparing, by the processor of the computing system, master data corresponding to the received data and having no missing part with the probably missing part;
   relocating, by the processor of the computing system, the combination of the plurality of operators to define a second stream processing line,
      wherein the relocation of the combination of the plurality of operators is determined in accordance with at least one of a group consisting of a probability of the missing, a type of the missing, a range of influence of a result of the stream processing due to the missing, an order of priority of an output the result of the stream processing, a dependency relationship among operators of the combination of the plurality of operators, a processing time allowable for updating the result of the stream processing, or a system resource available for the updating the result of the stream processing; if the received data has the missing part, updating, by the processor of the computing system, the result of the stream processing by using the master data and the second stream processing line;

the method further comprising:

calculating an amount of the system resource required for execution of the combination of the plurality of relocated operators to process the received data in real time;

determining that the calculated required amount of the system resource exceeds a system resource availability threshold;

determining that the calculated required amount of the system resource is reducible to below the threshold;

reducing the calculated required amount of the system resource by deleting a portion of modules of a particular operator of the combination of the plurality of relocated operators in response to determining that the calculated required amount of the system resource is reducible to below the threshold; and deploying the combination of the plurality of relocated operators according to the defined second stream processing line.

2. The method according to claim 1, wherein the step of updating the result of the stream processing includes:

processing, by the processor of the computing system, the master data in accordance with the second stream processing line; and using a result of the processing the master data to update the result of the stream processing.

3. The method according to claim 1, the method further comprising:

locating, by the processor of the computing system, the relocated combination of the plurality of operators on one of a group consisting of a plurality of processor nodes on a computer system and a plurality of virtual processor nodes on the computer system.

4. The method according to claim 1, wherein if at least one of a group consisting of a processing time allowable for the updating result is limited, or a system resource available for the updating the result is limited, the relocating of the combination of the plurality operators is determined in accordance with an order of priority of an output of the result.

5. The method according to claim 1, wherein the detecting a probably missing part in the received data further comprises:

outputting, by the processor of the computing system, at least one of a group consisting of a range of data that may have a missing part, a probability of the missing, a type of the missing, a range of influence of the result due to the missing, an order of priority of an output of the result, a dependency relationship among operators of the combination of the plurality of operators, a processing time required for the operators to perform the stream processing, or a system resource required for the operators to perform the stream processing.

6. The method according to claim 1, wherein the data is measured values from at least one sensor, and wherein the detecting the probably missing part in the received data includes:

detecting, by the processor of the computing system, the probably missing part using the measured values.

7. The method according to claim 1, wherein the data is measured values from at least one sensor, and wherein the step of detecting the probably missing part in the received data further includes:

detecting, by the processor of the computing system, a collection interval of the measured values.

8. The method according to claim 7, wherein the step of detecting the probably missing part in the received data further includes:

if a difference in the collection interval is detected, detecting data of a part in which the difference is detected as the probably missing part.

9. The method according to claim 8, wherein the step of updating the result of the stream processing includes:

updating, by the processor of the computing system, within the result of the stream processing, a second result caused by the missing due to the difference in the collection interval, using a third result obtained from the master data.

10. The method according to claim 1, wherein the detecting a probably missing part in the received data occur in response to at least one of a group consisting of the received data having a missing value in a time series, the received data having an abnormal value, the received data having a value that does not change for a fixed period, the received data having a value whose change rate is abnormal, a data collection interval change, a correlation among a plurality of related attributes being abnormal; a value obtained by comparing differences among values obtained from repeated actions being abnormal, or referencing to missing history data in which a missing history is stored.

11. The method according to claim 1, wherein the updating the result of the stream processing includes:

if the received data has the missing part, processing the master data so as to update a result caused from the missing part.

12. The method according to claim 1, wherein the step of updating a result of the stream processing includes:

updating, by the processor of the computing system, a report configured to indicate an update status in real time.

13. The method according to claim 12, wherein updating the report includes at least one of a group consisting of causing the report to indicate that the update is completed, causing the report to indicate that the data has no missing part, or causing the report to indicate a progress of the update.

14. The method according to claim 1, wherein the updating the result of the stream processing includes:

if the updating cannot be completed within a processing time allowable for the update, stopping, by the processor, the updating process; and marking, by the processor of the computing system, an unupdated result in response to stopping the updating process.

15. A computer system for reprocessing data having a missing part, the system comprising at least one computer configured for:

receiving, by a processor of a computing system, data;

stream-processing, by the processor of the computing system, the received data in real time;

detecting, by the processor of the computing system, a probably missing part in the received data during the stream processing by:

stream processing of the received data in a first stream processing line that is a combination of a plurality of operators, each operator of the plurality of operators being one processing unit;

verifying, by the processor of the computing system, whether the received data has a missing part by comparing master data corresponding to the received data and having no missing part with the probably missing part;

relocating, by the processor of the computing system, the combination of the plurality of operators to define a second stream processing line, wherein the relocation of the combination of the plurality of operators is determined in accordance with at least one of a group consisting of a probability of the missing, a type of the missing, a range of influence of a result of the stream processing due to the missing, an order of priority of an output of the result of the stream processing, a dependency relationship among operators of the combination of the plurality of operators, a processing time allowable for updating the result of the stream processing, or a system resource available for the updating the result of the stream processing;

updating, by the processor of the computing system, the result of the stream processing using the master data and the second stream processing line if the received data has a missing part; wherein the at least one computer is further configured for:

calculating an amount of the system resource required for execution of the combination of the plurality of relocated operators to process the received data in real time;

determining that the calculated required amount of the system resource exceeds a system resource availability threshold;

determining that the calculated required amount of the system resource is reducible to below the threshold;

reducing the calculated required amount of the system resource by deleting a portion of modules of a particular operator of the combination of the plurality of relocated operators in response to determining that the calculated required amount of the system resource is reducible to below the threshold; and deploying the combination of the plurality of relocated operators according to the defined second stream processing line.

16. The computer system according to claim 15, wherein the at least one computer is further configured for:

executing, by the processor of the computing system, the stream processing on the received data in a first stream processing line that is a combination of a plurality of operators, each operator of the combination of the plurality of operators being one processing unit; and relocating, by the processor of the computing system, the combination of the plurality of operators to define a second stream processing line for performing the updating the result of the stream processing.

17. A non-transitory, computer-readable storage medium having program instructions embodied therewith, the program instructions configured to cause a computer to perform a method comprising:

receiving, by a processor, data;

obtaining, by the processor, a first result set by stream processing, in real time, the received data in a first stream processing line, wherein the first stream processing line is a combination of a plurality of operators, each operator of the plurality of operators being one processing unit;

detecting, by the processor while stream-processing of the received data in real time, that a data part is probably not included in the received data;

comparing, by the processor in response to the detecting, the received data to a data portion of master data, the master data corresponding to the received data, the data portion including the data part;

determining, by the processor based on the comparing, that the data part is not included in the received data;

identifying, by the processor, a first operator of the first stream processing line that is not associated with the data portion;

defining, by the processor in response to the determining and based on the identifying, a second processing line by deleting the first operator from the first stream processing line, wherein the identifying and the defining is determined in accordance with at least one of a group consisting of a probability of the missing, a type of the missing, a range of influence of a first result of the stream processing due to the missing, an order of priority of an output of the first result, a dependency relationship among operators of the combination of the plurality of operators, a processing time allowable for updating the first result, or a system resource available for the updating the first result;

obtaining, by the processor, a second result set by stream processing the data portion of the master data in the second processing line; and updating, by the processor, the first result set using the second result set;

calculating an amount of the system resource required for execution of the combination of the plurality of relocated operators to process the received data in real time;

determining that the calculated required amount of the system resource exceeds a system resource availability threshold;

determining that the calculated required amount of the system resource is reducible to below the threshold;

reducing the calculated required amount of the system resource by deleting a portion of modules of a particular operator of the combination of the plurality of relocated operators in response to determining that the calculated required amount of the system resource is reducible to below the threshold; and deploying the combination of the plurality of relocated operators according to the defined second stream processing line.

18. The non-transitory, computer-readable storage medium of claim 17, wherein the method further comprises:

collecting, from a sensor, the master data in intervals;

dispatching the data portion of the master data to the second processing line; and storing the updated first result set in a data structure.

* * * * *